(12) United States Patent
Taoka et al.

(10) Patent No.: US 8,681,886 B2
(45) Date of Patent: Mar. 25, 2014

(54) COMMUNICATION APPARATUS AND COMMUNICATION METHOD IN MOBILE COMMUNICATION SYSTEM

(75) Inventors: Hidekazu Taoka, Tokyo (JP); Tetsushi Abe, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 497 days.

(21) Appl. No.: 12/994,214

(22) PCT Filed: May 20, 2009

(86) PCT No.: PCT/JP2009/059260
§ 371 (c)(1),
(2), (4) Date: Feb. 16, 2011

(87) PCT Pub. No.: WO2009/142236
PCT Pub. Date: Nov. 26, 2009

(65) Prior Publication Data
US 2011/0182337 A1 Jul. 28, 2011

(30) Foreign Application Priority Data

May 23, 2008 (JP) .................................. 2008-136019
Nov. 5, 2008 (JP) .................................. 2008-284767

(51) Int. Cl.
*H04K 1/10* (2006.01)
(52) U.S. Cl.
USPC ........................................................ 375/260
(58) Field of Classification Search
USPC ......... 375/135, 146, 260, 261, 298, 300, 308;
455/513, 67.13, 102, 108, 115.3
See application file for complete search history.

(56) References Cited

U.S. PATENT DOCUMENTS

| 2006/0023624 | A1* | 2/2006 | Han et al. | 370/204 |
| 2008/0232489 | A1* | 9/2008 | Tsai et al. | 375/260 |
| 2009/0252242 | A1* | 10/2009 | Kim et al. | 375/260 |
| 2009/0303913 | A1* | 12/2009 | Yu et al. | 370/312 |

FOREIGN PATENT DOCUMENTS

| CN | 101087287 A | 12/2007 |
| JP | 2004-194262 A | 7/2004 |
| JP | 2006-287551 A | 10/2006 |
| JP | 2008-118380 A | 5/2008 |

OTHER PUBLICATIONS

Patent Abstracts of Japan, Publication No. 2008-118380, dated May 22, 2008, 1 page.
Patent Abstracts of Japan, Publication No. 2004-194262, dated Jul. 8, 2004, 1 page.

(Continued)

*Primary Examiner* — Young T. Tse
(74) *Attorney, Agent, or Firm* — Osha Liang LLP

(57) ABSTRACT

The communication apparatus includes: a processing unit 52 configured to determine a data modulation scheme for each stream based on first signal quality q1 for each stream determined by the MMSE method; a processing unit 54 configured to determine second signal quality q2 corresponding to the first signal quality q1; a processing unit configured to determine third signal quality q3(1) of a stream by adding first signal quality q1(1) of the stream and a correction value Δq(1) derived from second signal quality q2(2) of equal to or more than 1 stream other than the stream; and a processing unit 58 configured to determine channel coding rate Rk corresponding to third signal quality q3(1) for each stream. The determined data modulation scheme and channel coding scheme are used for transmission of a following stream.

28 Claims, 19 Drawing Sheets

(56) References Cited

OTHER PUBLICATIONS

Patent Abstracts of Japan, Publication No. 2006-287551, dated Oct. 19, 2006, 1 page.
NTT DoCoMo, et al., "Investigation on MU-MIMO in E-UTRA Downlink," 3GPP TSG RAN WG1 Meeting #52, R1-081040; Sorrento, Italy; Feb. 11-15, 2008; 6 pages.
Lucent Technologies, "PARC with APP decoding for HSDPA," 3GPP TSG RAN WG1, TSG-R1-(02)0325; Orlando, USA; Feb. 18-22, 2002; 6 pages.
NTT DoCoMo, et al., "Link Adaptation Scheme for Single-antenna Transmission in E-UTRA Downlink," 3GPP TSG-RAN WG1 Meeting #44bis, R1-060987 (original R1-060306); Athens, Greece; Mar. 27-31, 2006; 8 pages.
International Search Report issued in PCT/JP2009/059260, mailed on Jun. 16, 2009, with translation, 9 pages.
Written Opinion issued in PCT/JP2009/059260, mailed on Jun. 16, 2009, 3 pages.
Office Action in corresponding Chinese Patent Application No. 200980128385.7 dated Apr. 2, 2013, with translation (13 pages).
Espacenet Publication Abstract for CN101087287, publication date Dec. 12, 2007 (1 page).

\* cited by examiner

Prior Art

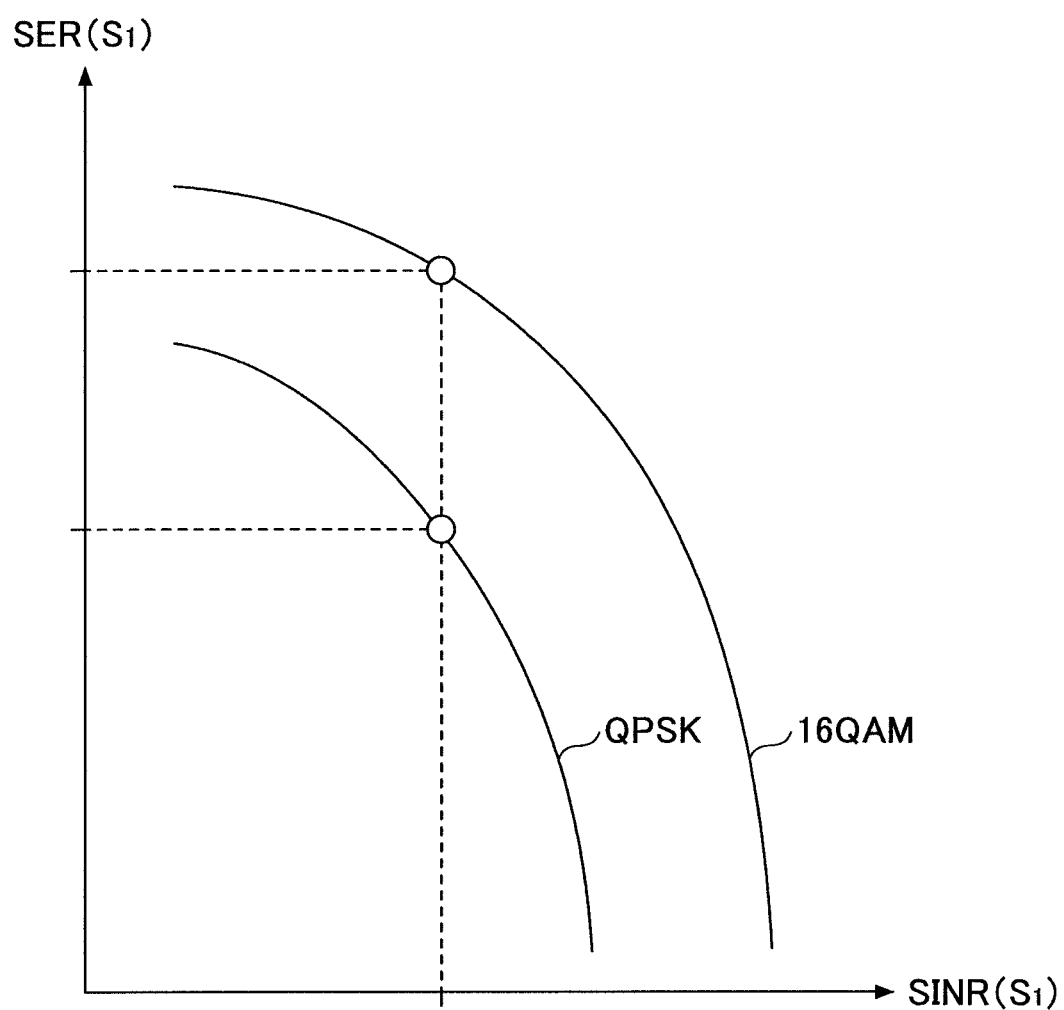

FIG.17

| | |
|---|---|
| SYSTEM BANDWIDTH | 5 MHz |
| SUBCARRIER TOTAL NUMBER | 300 |
| SUBCARRIER INTERVAL | 15 kHz |
| BANDWIDTH OF RESOURCE BLOCK | 180 kHz (12 SUBCARRIERS) |
| SYMBOL PERIOD — EFFECTIVE DATA LENGTH | 66.67 μsec |
| SYMBOL PERIOD — CYCLIC PREFIX | 4.75 μsec |
| TRANSMISSION TIME INTERVAL (TTI) | 1.0 msec (14 OFDM symbols) |
| MODULATION AND CHANNEL CODING RATE (R) | 16 LEVELS<br>QPSK, R=1/16, 1/8. 1/6,1/3,4/9, 3/5<br>16QAM, R=2/5, 1/2, 3/5<br>64QAM, R= 4/9, 5/9, 2/3, 3/4, 6/7, 12/13 |
| CHANNEL CODING/DECODING | TURBO CODING (K = 4) / Max-Log-MAP DECODING |
| CODE WORD METHOD | MULTI-CODE WORD (MCW) |
| MIMO CONFIGURATION | 2-by-2 MIMO |
| CHANNEL MODEL | PATH: TU CHANNEL MODEL/FLAT<br>SPACE INTERRELATED FACTOR: α = −0.4616 + 0.5439i |
| MAXIMUM DOPPLER FREQUENCY | $f_D$ = 5.55 Hz (v = 3 km/h) |
| CHANNEL ESTIMATION | IDEAL |
| SIGNAL DETECTION METHOD | MMSE, MLD |
| PRECODING | CODE BOOK METHOD IN LTE |
| CONTROL DELAY DUE TO AMC AND PRECODING | 3 TTI (= 3 msec) |

COMMUNICATION APPARATUS AND COMMUNICATION METHOD IN MOBILE COMMUNICATION SYSTEM

TECHNICAL FIELD

The present invention relates to a technical field of mobile communications. More particularly, the present invention relates to a communication apparatus and a communication method for use in a mobile communication system that uses a multiple-input and multiple-output (MIMO) scheme and an adaptive Modulation and coding (AMC) scheme.

BACKGROUND ART

In recent years, requests for improving data rate, capacity, diversification and quality for mobile communications are strengthening more and more. Especially, from the viewpoint of achieving high speed and large capacity, the communication technology of the MIMO scheme receives attention. In the MIMO scheme, each of a plurality of transmission streams propagates in a space in different ways, so as to improve transmission speed or signal quality. The receiving side needs to separate the plurality of streams properly. Several techniques have been proposed as the signal separation method. As examples, there are Minimum Mean Square Error (MMSE) method, Maximum Likelihood Detection (MLD) method, computation amount reducing type MLD (example: QRM-MLD) method, and the like.

In view of improving throughput of the whole system by performing transmission using a proper transmission rate according to channel states that change over time, the Adaptive Modulation and Channel Coding (AMC) scheme may be performed.

FIG. 1 is a diagram for explaining the principle of the AMC scheme. FIG. 1 schematically shows throughput that can be achieved by specific MCS from the viewpoint of signal quality SINR. The achievable transmission rate increases in an ascending order of MCS1, MCS2 and MCS3. MCS is an abbreviation of Modulation and Coding Scheme. The data modulation scheme may be determined like $M_1$=QPSK, $M_2$=16 QAM, $M_3$=64 QAM, ..., for example. The channel coding rate may be determined as $R_1$=1/8, $R_2$=2/8, $R_3$=3/8, ... and the like. Combinations of the data modulation scheme and the channel coding scheme are predetermined according to achievable transmission rates (MCS1, MCS2, ..., for example). Quality of a channel state can be estimated by a degree of signal quality such as SNR. In general, the better the signal quality is, the higher the transmission rate that can be used becomes, so that throughput increases. Conversely, when the signal quality is bad, only a low transmission rate can be used, so that the throughput becomes small. In the case of the example shown in the figure, although either of MCS1 and MCS2 can be used for signal quality q1, MCS2 (the data modulation scheme is 16 QAM, and the channel coding rate is 1/2) should be used from the viewpoint of achieving a higher transmission rate (throughput). The determination criterion for selecting MCS may be, for example, a criterion for increasing throughput of individual users or a criterion for increasing throughput of the whole system. Or, conversely, MCS1 may be selected in favor of certainty of data transmission. Accordingly, since a transmission rate suitable for the channel state is properly used according to the channel state in AMC, to select proper MCS is also referred to as link adaptation.

In the MIMO scheme, there are a plurality of transmission streams, and each of them is transmitted with each different channel state (that is, propagation route). Therefore, in the case of the MIMO scheme, there is a room for performing AMC for each transmission stream.

FIG. 2 shows an example of a system in a case where two antennas are provided for each of transmission and reception, and the MLD method is used for signal separation. In the example shown in the figure, the stream #1 is channel-coded, interleaved, and data-modulated, and after that, the stream #1 is transmitted from the antenna #1. Similarly, the stream #2 is also channel-coded separately, interleaved, data-modulated, and after that, the stream #2 is transmitted from the antenna #2 separately. In the receiving side, processing of signal separation is performed on the signals received by the antennas #1 and #2 so that the signals are separated into each stream. Each separated stream is deinterleaved and channel-decoded. On the other hand, channel estimation is performed based on the received signal before channel separation. As a result, link adaptation is performed. The decision result (proper MCS) of the link adaptation is fed back to the transmission side, so that the result is used for transmission of streams after that.

In the case of the system example shown in FIG. 2, the received signal $[r_1 \ r_2]^T$ before signal separation can be represented as the following equation (wherein "T" indicates transposition).

$$r \equiv \begin{bmatrix} r_1 \\ r_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad (1)$$

$$= h_1 s_1 + h_2 s_2 + n \quad (2)$$

$$= Hs + n \quad (3)$$

$$E[nn^H] = \sigma^2 I$$

Meaning of each symbol is as follows.
$r_i$: a signal received by an i-th receiving antenna
$h_{ij}$: channel variation between j-th transmission antenna and i-th receiving antenna (channel matrix element)
$n_i$: noise at the i-th receiving antenna
$s_j$: symbol of j-th stream, $E\{|s_j|^2\}=1$ (E represents expected value)
$\sigma^2$: noise power When the MMSE method, instead of the MLD method, is used for signal separation, signal quality SINR for each of streams after signal separation can be derived easily. More particularly, the signal quality $SINR_{MMSE}(1)$ for the stream #1 and the signal quality $SINR_{MMSE}(2)$ for the stream #2 can be calculated as shown in the following equations.

$$SINR_{MMSE}(1) = \frac{h_1^H R^{-1} h_1}{1 - h_1^H R^{-1} h_1} \quad (4)$$

$$SINR_{MMSE}(2) = \frac{h_2^H R^{-1} h_2}{1 - h_2^H R^{-1} h_2} \quad (5)$$

$$R = (h_1 h_1^H + h_2 h_2^H + \sigma^2 I) \quad (6)$$

Therefore, based on the principle shown in FIG. 1, MCS suitable for each stream can be easily determined for each stream. As to the stream #1, a proper MCS can be determined using $SINR_{MMSE}(1)$, and, as to the stream #2, a proper MCS can be determined using $SINR_{MMSE}(2)$.

On the other hand, as to the MLD method, all combinations of symbol groups and MCS are searched, so that an optimum symbol group and MCS are estimated. Therefore, it can be expected that receiving characteristics become better than that of the MMSE method. However, when the MLD method is used, it is not easy to obtain signal quality SINR for each stream. As is well known, in the MLD method, a symbol group each including a plurality of symbols in a plurality of streams transmitted at the same time is assumed, and the most likely symbol group is specified from among all possible symbol groups so that the transmitted symbol group is estimated. For example, when the number of streams is 2, a symbol group or a symbol pair of $s=[s_1,s_2]^T$ is assumed, in which $s_1$ represents a symbol included in the stream #1, $s_2$ represents a symbol included in the stream #2, and T represents transposition. Assuming that "$Q^2$" is a set of the whole symbol groups, the symbol group $S_{ML}$ that is finally detected by the MLD method can be represented as follows.

$$s_{ML} = \underset{s \in Q^2}{\operatorname{argmin}} \|r - Hs\| \tag{7}$$

$S_{ML}$ is a symbol group by which the distance between the actual received signal r and a symbol group s that has received effect of channel variation (represented by channel matrix H) is the minimum, wherein the distance is evaluated by a square of Euclid distance in symbol constellation. Since signal detection is performed for each symbol group from all streams instead of for each stream, it is not so easy compared to the case of the MMSE method to obtain signal quality SINR for each stream. If SINR of each stream is left unknown, it becomes difficult to perform AMC based on the principle shown in FIG. 1. Therefore, it can be considered to estimate SINR for each stream in the following way.

FIG. 3 is a diagram for explaining a method example when adopting the AMC scheme in the MIMO scheme. The functional block in the figure is associated with a link adaptation unit of a conventional communication apparatus. In the example shown in the figure, two streams of the first stream and the second stream are transmitted, and three data modulation schemes of QPSK, 16 QAM and 64 QAM are prepared for the first stream and they are represented as $M_1$, $M_2$, $M_3$ respectively. Also, three data modulation schemes of QPSK, 16 QAM and 64 QAM are prepared for the second stream and they are represented as $M_1$, $M_2$, $M_3$ respectively. In the figure, "for i=1:3 . . . end" indicates performing calculation repeatedly while changing the variable i of data modulation scheme Mi for the first stream. Also, "for j=1:3 . . . end" indicates performing calculation repeatedly while changing the variable j of data modulation scheme Mj for the second stream. K types of channel coding rates are prepared as $(R_1,R_2,\ldots,R_K)$. Also, it is assumed that MCS is selected from the viewpoint of improving the whole throughput achievable in the whole of the first and the second streams.

In the example shown in the figure, first, a symbol error rate is estimated for each stream for a combination of modulation schemes of Mi and Mj by a union bound symbol error probability calculation unit. The symbol error rate SER(m) of a m-th stream is estimated by the following equation (refer to non-patent document 1).

$$SER(m) = \frac{1}{K} \sum_s \sum_{\substack{c \\ c_m \neq s_m}} Pr(c,s) \tag{8}$$

with $Pr(c,s) = Q\left(\sqrt{\frac{E_s\|H(c-s)\|^2}{N_s\sigma^2}}\right)$ (9)

Meaning of each symbol is as follows.
m: stream index
$s_m$: m-th element of vector s
$c_m$: m-th element of vector c
Pr(c,s): probability by which vector s is erroneously estimated as vector c
K: the number of vector s
Es: total transmission power
Ns: the number of streams
Q( ): Q function The symbol error rates SER(1) and SER(2) estimated by the union bound symbol error probability calculation unit for each stream are converted into signal qualities (desired signal power to undesired signal power ratio, in the example shown in the figure) SINR(1) and SINR(2) respectively by the AWGN_SNR mapping unit. The AWGN_SNR mapping unit obtains the desired signal power to undesired signal power ratio (SINR), for each stream, that can be achieved with a specific symbol error rate in consideration of additive Gaussian noise. The rate selection unit for the first stream derives a corresponding channel coding rate $R_{k1}$ from data modulation scheme Mi and SINR(1). The rate selection unit for the second stream derives a corresponding channel coding rate $R_{k2}$ from data modulation scheme Mj and SINR(2).

Correspondence relationship between signal quality and MCS (combination of data modulation scheme and channel coding rate) is predetermined as shown in FIG. 4, for example. The throughput calculation unit calculates a throughput (bps/Hz) based on the combination of the data modulation scheme and the channel coding rate for each stream. Throughputs achievable for each stream are combined, and the combined throughput is shown as "Thr_e" in the figure. When the combined throughput Thr_e is greater than a predetermined threshold Max_Thr, the data modulation scheme and the channel coding rate that have been derived for each stream are set to be a candidate to be used for data transmission.

RELATED ART DOCUMENT

[Non-patent document 1] 3GPP R1-020325, Lucent Technologies, PARC with APP decoding for HSDPA

DISCLOSURE OF THE INVENTION

Problem to be Solved by the Invention

However, in the above method, the above-mentioned calculation (FIG. 3) needs to be performed for every combination of data modulation schemes and for every symbol group, so that computation amount is very large and the calculation is complicated, which is particularly disadvantageous for mobile terminals that do not have much battery capacity and computation resources. In addition, in the above-mentioned calculation method, the symbol error rate SER(m) is calculated by using the equations (8) and (9) so as to approximate SINR for each stream. Therefore, when the accuracy of the symbol error rate SER(m) is not good, there is a fear that the throughput improving effect by link adaptation also deteriorates.

An object of the present invention is to simplify link adaptation and to improve accuracy of the link adaptation in a mobile communication system that uses the MIMO scheme and the adaptive modulation channel coding scheme.

Means for Solving the Problem

A communication apparatus used in an embodiment of the present invention is used in a mobile communication system that uses a MIMO scheme and an adaptive modulation channel coding scheme. The communication apparatus is a communication apparatus for use in a mobile communication system that uses a MIMO scheme and an adaptive modulation channel coding scheme, including:

a processing unit configured to determine a data modulation scheme for each stream based on reference signal quality for each stream determined by a signal detection method which is different from a maximum likelihood estimation method;

a processing unit configured to determine a correction value according to an interference amount which each stream receives, based on the reference signal quality and the data modulation scheme of each stream;

a processing unit configured to determine signal quality for rate determination for a stream by adding the reference signal quality and the correction value of the stream; and a processing unit configured to determine a channel coding rate corresponding to the signal quality for rate determination for each stream, wherein the determined data modulation scheme and channel coding scheme are used for transmission of a following stream.

Effect of the Present Invention

According to an embodiment of the present invention, link adaptation can be simplified and accuracy of the link adaptation improves in a mobile communication system that uses the MIMO scheme and the adaptive modulation channel coding scheme.

BRIEF DESCRIPTION OF THE DRAWINGS

FIG. 6 is a diagram schematically showing mutual relationship between data modulation scheme, symbol error rate SER and signal quality SINR;

FIG. 17 is a diagram showing parameter data used for the simulation; and

PREFERRED EMBODIMENTS FOR CARRYING OUT THE INVENTION

Figure 1:
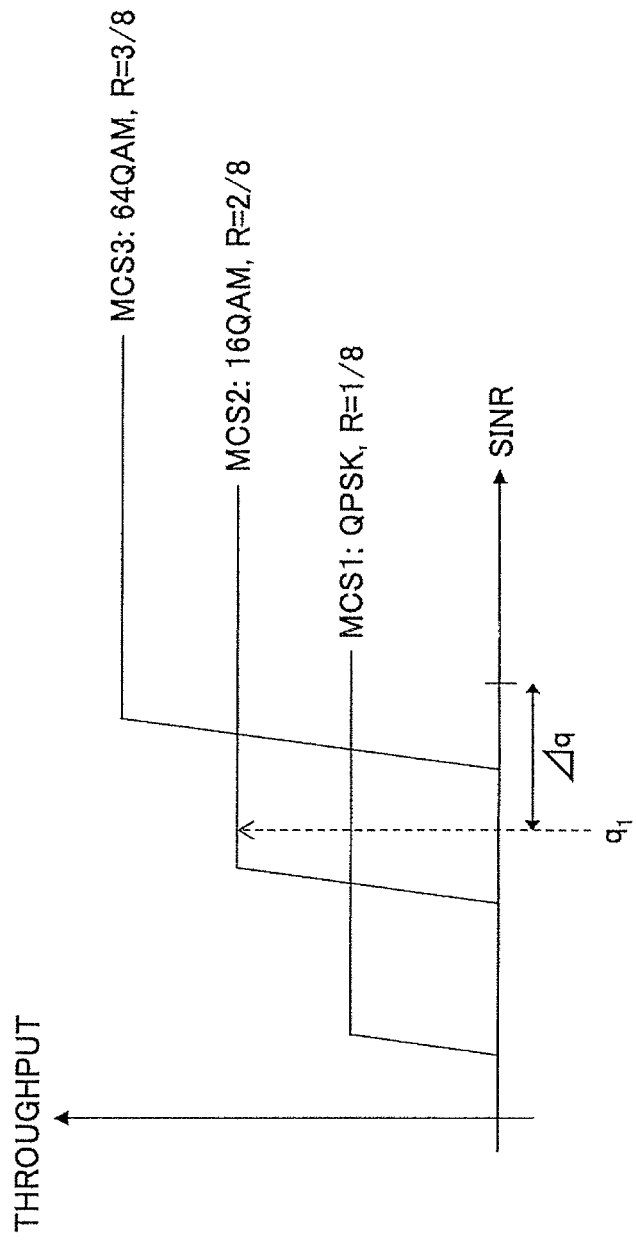
FIG. 1 is a diagram for explaining principle of AMC.
Figure 2:
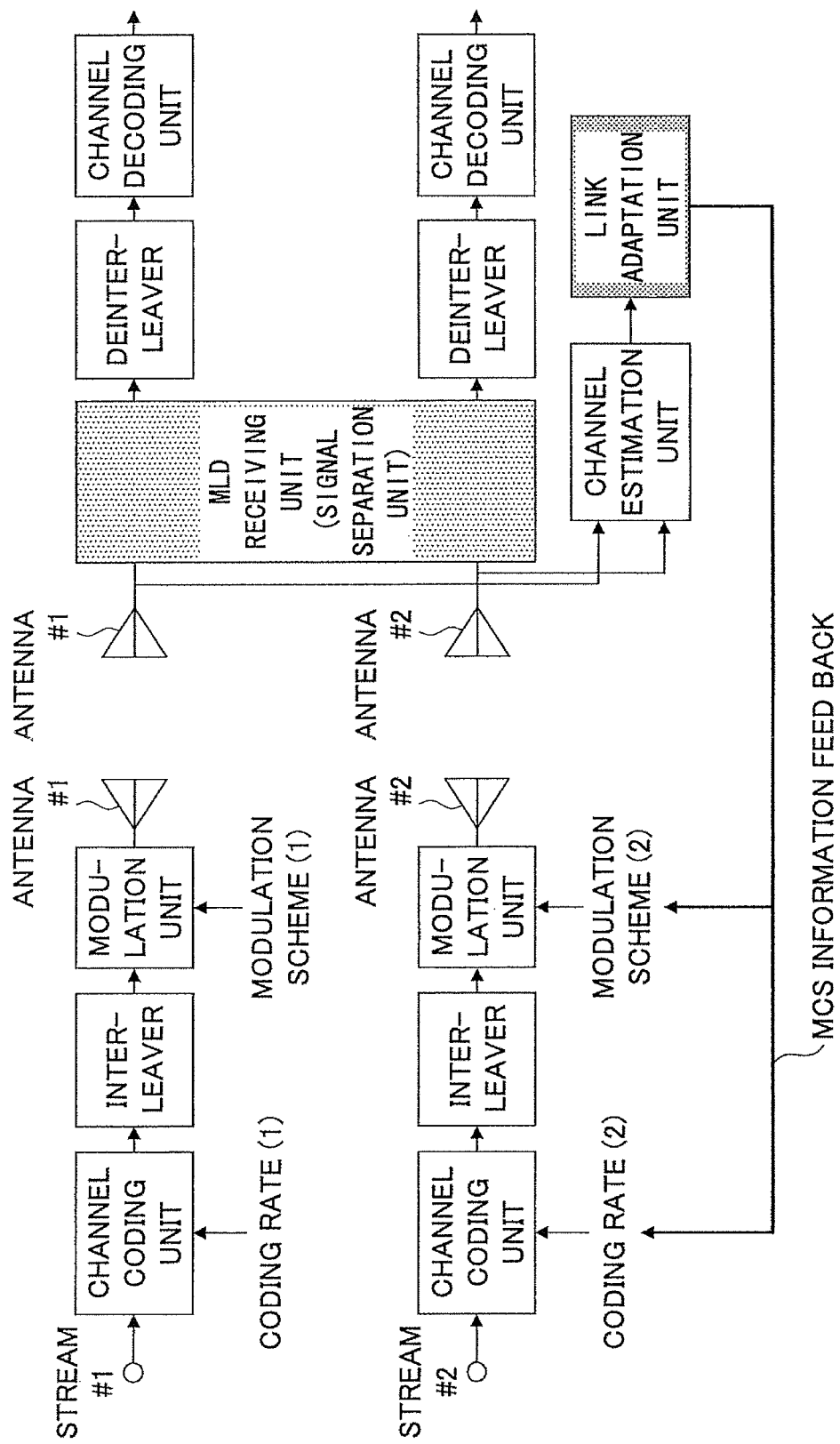
FIG. 2 is a diagram showing an example of a system in a case where two antennas are provided for each of transmission and reception.

A communication apparatus of an embodiment of the present invention is used in a mobile communication system that uses a MIMO scheme and an adaptive modulation channel coding scheme, and includes: a processing unit 52 configured to determine a data modulation scheme for each stream based on reference signal quality q1 (also to be referred to as first signal quality for the sake of convenience) for each stream determined by a signal detection method (MMSE) which is different from a maximum likelihood estimation method; a processing unit (54, 56) configured to determine a correction value $\Delta q$ according to an interference amount (also to be referred to as second signal quality q2 for the sake of convenience) which each stream receives, based on the reference signal quality q1 and the data modulation scheme of each stream; a processing unit (adding unit) configured to determine signal quality for rate determination q3 (also to be referred to as third signal quality for the sake of convenience) for a stream by adding the reference signal quality q1 and the correction value $\Delta q$ of the stream; and a processing unit 58 configured to determine a channel coding rate corresponding to the signal quality for rate determination q3 (also to be referred to as third signal quality for the sake of convenience) for each stream. The determined data modulation scheme and channel coding scheme are used for transmission of a following stream.

Accordingly, appropriate MCS of each stream can be found easily without searching all possible combinations of data modulation schemes for each stream, and MCS estimation accuracy can be improved by using the correction value. That is, it becomes possible to simplify and achieve high accuracy of link adaptation.

A candidate of the data modulation scheme of each stream is selected from among a plurality of choices, and the channel coding rate may be determined for the selected data modulation scheme. A data modulation scheme and a channel coding rate of each stream may be determined such that throughput achievable by a plurality of streams becomes high. This configuration of considering a plurality of candidates is preferable from the viewpoint of improving throughput with reliability compared to the case in which only a single candidate is considered.

A main candidate corresponding to reference signal quality of each stream is derived from among the plurality of choices of data modulation schemes, and the channel coding rate may be determined for at least the main candidate. A sub-candidate having a rate different from the rate of the main candidate by a predetermined level is determined for each of first and second streams, and a channel coding rate and throughput of each stream may be calculated for a predetermined combination including the main candidate or the sub-candidate among all possible combinations of data modulation schemes of the first and the second streams. This configuration is preferable from the viewpoint of improving calculation efficiency by performing calculation by limiting candidates to a part of likely candidates from among all possible candidates.

The predetermined combination including the main candidate or the sub-candidate may include: a combination (main, main) of a main candidate of the first stream and a main candidate of the second stream, or a combination (sub, sub) of a sub-candidate having a higher rate than the rate of the main candidate of the first stream and a sub-candidate having a lower rate than the rate of the main candidate of the second stream. This configuration is preferable from the viewpoint of deriving a candidate, from a plurality of choices, that can keep data throughput to be constant as much as possible.

The signal detection method which is different from the maximum likelihood estimation method may be a minimum mean square error (MMSE) method. The MMSE method can calculate signal quality for each stream relatively easily. The signal quality is used for specifying the data modulation quality. Since accuracy of signal quality does not need to be very high for finding a proper data modulation scheme, it is preferable to use the MMSE method for that purpose from the viewpoint of improving efficiency of calculation processing.

The correction value $\Delta q=\alpha(SINR_{free}-SINR_{MMSE})$ may be calculated such that the correction value is in proportion to a difference between signal quality $SINR_{free}$ in a case where inter-stream interference can be neglected and the reference signal quality $q1=SINR_{MMSE}$. This configuration is preferable from the viewpoint of surly ensuring that the signal quality for rate determination q3 for finally specifying MCS is equal to or less than an upper limit vale $SINR_{free}$ and equal to or greater than a lower limit value $SINR_{MMSE}$.

A proportionality coefficient a used for calculating the correction value may be predetermined according to a possible value of an interference amount which the stream receives. In the MLD method, a stream becomes an interference stream for other stream, and detection accuracy of a stream depends on detection accuracy of the interference stream. From the viewpoint of properly adjusting the signal quality for rate determination q3 to move it closer to the upper value or to the lower value according to the degree of interference between streams, it is preferable to determine the proportionality coefficient according to q2 related to detection accuracy of interference stream.

The proportionality coefficient used for calculating the correction value of a stream may be determined according to radio channel state and/or a data modulation scheme of other stream.

From the viewpoint of specifying the data modulation scheme with small calculation amount, it is preferable that the signal detection method which is different from the maximum likelihood estimation method is a zero forcing (ZF) method. When using a calculation amount reducing type MLD method (a maximum likelihood estimation method using QR decomposition (QRM-MLD), Sphere decoding method and the like) as a signal separation method, the first communication quality can be estimated from a matrix obtained by triangulating a channel matrix and from noise power. Accordingly, a circuit common to the signal separation unit can be used.

When the signal quality for rate determination q3 of a stream exceeds a predetermined value, the data modulation method of the stream may be changed. The reason is that, when the correction value $\Delta q$ is large, the signal quality for rate determination q3 becomes substantially greater than the reference signal quality q1, so that there is a possibility that a suitable data modulation scheme changes. It is preferable to leave flexibility of changing the data modulation scheme from the viewpoint of determining a more suitable MCS. In addition, when the signal quality for rate determination q3 of a certain stream exceeds a predetermined value, the channel coding rate of a stream other than the certain stream may be also changed. When the data modulation scheme changes, the symbol error rate of the stream also changes and interference exerted to other stream also changes, and as a result, MCS selected for other stream may change. From the viewpoint of following such operation properly, it is preferable to leave flexibility of changing the channel coding rate according to change of the data modulation scheme. The predetermined value may be determined for each modulation scheme so that MCS control can be performed with greater flexibility.

The interference amount which the stream receives may be derived from a symbol error rate (SER) or a desired signal power to undesired signal power ratio (SINR) and a data modulation scheme of each stream.

The communication apparatus may be prepared for a user apparatus, and may be prepared for a base station apparatus.

A communication method of an embodiment of the present invention is used in a mobile communication system that uses a MIMO scheme and an adaptive modulation channel coding scheme. The method includes the steps of: determining a data modulation scheme for each stream based on reference signal quality for each stream determined by a signal detection method which is different from a maximum likelihood estimation method; determining a correction value according to an interference amount which each stream receives based on the reference signal quality and the data modulation scheme of each stream; determining signal quality for rate determination for a stream by adding the reference signal quality and the correction value of the stream; and determining a channel coding rate corresponding to the signal quality for rate determination for each stream. The determined data modulation scheme and channel coding scheme are used for transmission of a following stream.

For convenience of explanation, the present invention is described while the present invention is divided into several embodiments or items. But, classification into each embodiment or item is not essential in the present invention, and features described in equal to or more than two embodiments or items may be used as necessary by combining them. While specific numerical value examples are used to facilitate understanding of the present invention, such numerical values are merely examples, so that any appropriate value may be used unless specified otherwise.

[Embodiment 1]

Figure 5A:
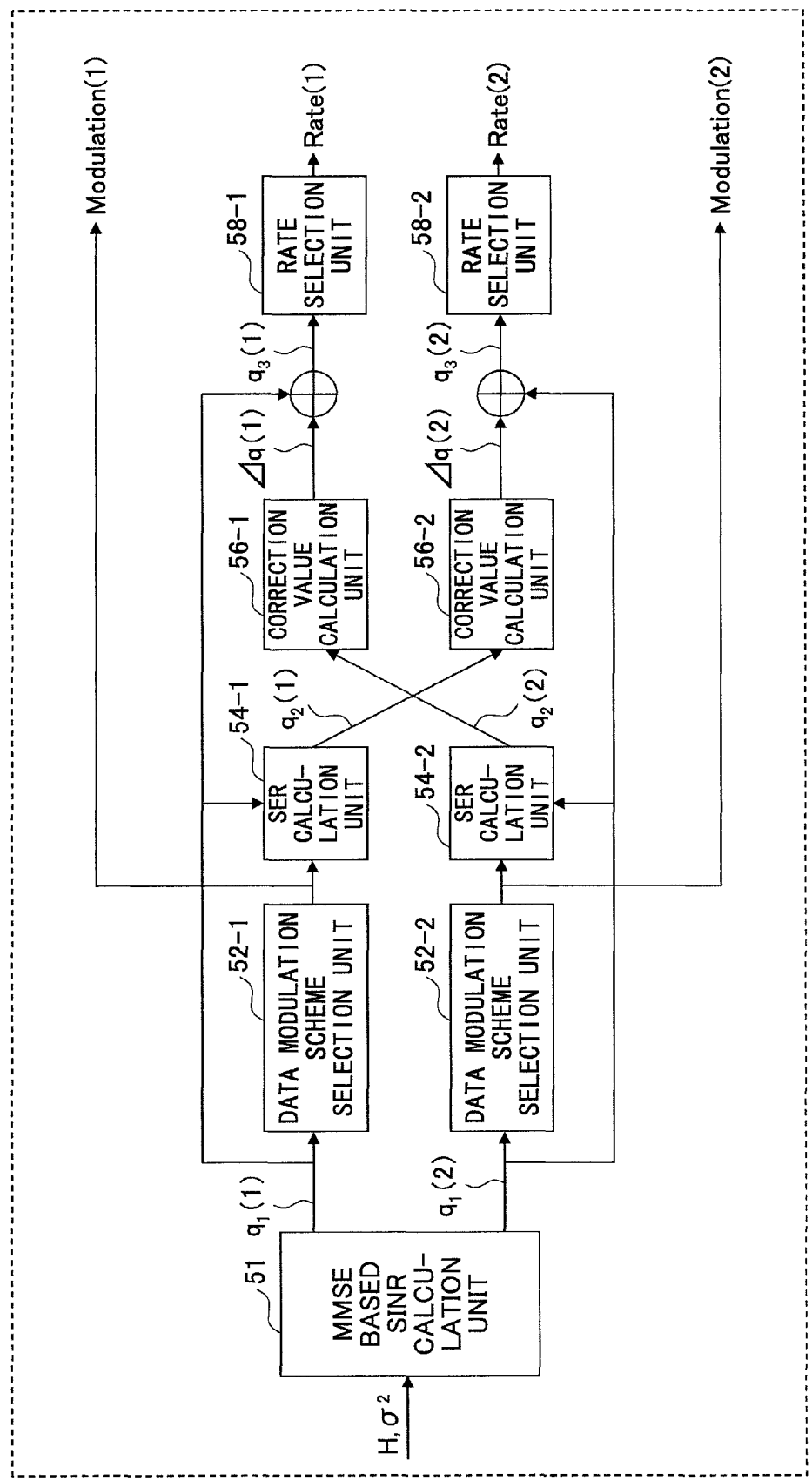
FIG. 5A is a diagram showing a link adaptation unit of a communication apparatus of a first embodiment.

FIG. 5A shows a link adaptation unit of a communication apparatus according to an embodiment of the present invention. FIG. 5A shows a MMSE based SINR calculation unit 51, data modulation scheme selection units 52-1 and 52-2, SER calculation units 54-1 and 54-2, correction value calculation units 56-1 and 56-2, and rate calculation units 58-1 and 58-2. Components other than the MMSE based SINR calculation unit 51 are prepared for each stream. The number of streams is 2 in the example shown in the figure. But, the number of the streams may be greater than 2. Although all or a part of functional components shown in FIG. 5A may be provided in a user apparatus, it is assumed that all of the functional components shown in the figure are provided in the user apparatus for the sake of explanation.

The MMSE based SINR calculation unit 51 detects a signal of each stream from the received signal using the minimum mean square error (MMSE) method. As mentioned above, the received signal r is represented as the following equation.

$$r \equiv \begin{bmatrix} r_1 \\ r_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad (1)$$

$$= h_1 s_1 + h_2 s_2 + n \quad (2)$$

$$= Hs + n \quad (3)$$
$$E[nn^H] = \sigma^2 I$$

Meaning of each symbol is as follows.
$r_i$: a signal received by i-th receiving antenna
$h_{ij}$: channel variation between j-th transmission antenna and i-th receiving antenna (channel matrix element)
$n_i$: noise at the i-th receiving antenna
$s_j$: symbol of j-th stream, $E\{|s_j|^2\}=1$ (E represents expected value)
$\sigma^2$: noise power The MMSE based SINR calculation unit 51 calculates signal quality for each stream. In the present embodiment, although signal qualities are represented as the desired signal power to undesired signal power ratios $SINR_{MMSE}(1)$ and $SINR_{MMSE}(2)$ as shown in the following equation, the signal quality may be represented as any proper amount known in the technical field.

$$SINR_{MMSE}(1) = \frac{h_1^H R^{-1} h_1}{1 - h_1^H R^{-1} h_1} \quad (4)$$

$$SINR_{MMSE}(2) = \frac{h_2^H R^{-1} h_2}{1 - h_2^H R^{-1} h_2} \quad (5)$$

$$R = (h_1 h_1^H + h_2 h_2^H + \sigma^H I) \quad (6)$$

In the MMSE method, signal quality for each stream can be calculated in a simpler way compared to the MLD method.

For the sake of explanation, the signal quality $SINR_{MMSE}(1)$ calculated for the first stream is referred to as first signal quality q1(1) (or first reference signal quality q1(1)). The signal quality $SINR_{MMSE}(2)$ calculated for the second stream is referred to as first signal quality q1(2) (or first reference signal quality q1(2)). In general, the signal quality $SINR_{MMSE}(m)$ calculated for the m-th stream by the MMSE based SINR calculation unit 51 may be referred to as first signal quality q1(m).

In the present embodiment, although the first signal qualities q1(1) and q1(2) of each stream are prepared by the MMSE method, this is not essential for the present invention. Any proper method known in the technical field may be used. However, the present embodiment tries to reduce calculation load of the MLD method, it is desirable that the calculation method for the first signal qualities q1(1) and q1(2) is a simpler signal detection method different from the MLD method. For example, the zero forcing method (ZF method) may be used, and a calculation amount reducing type MLD method (QRM-MLD method) may be used.

Figure 4:
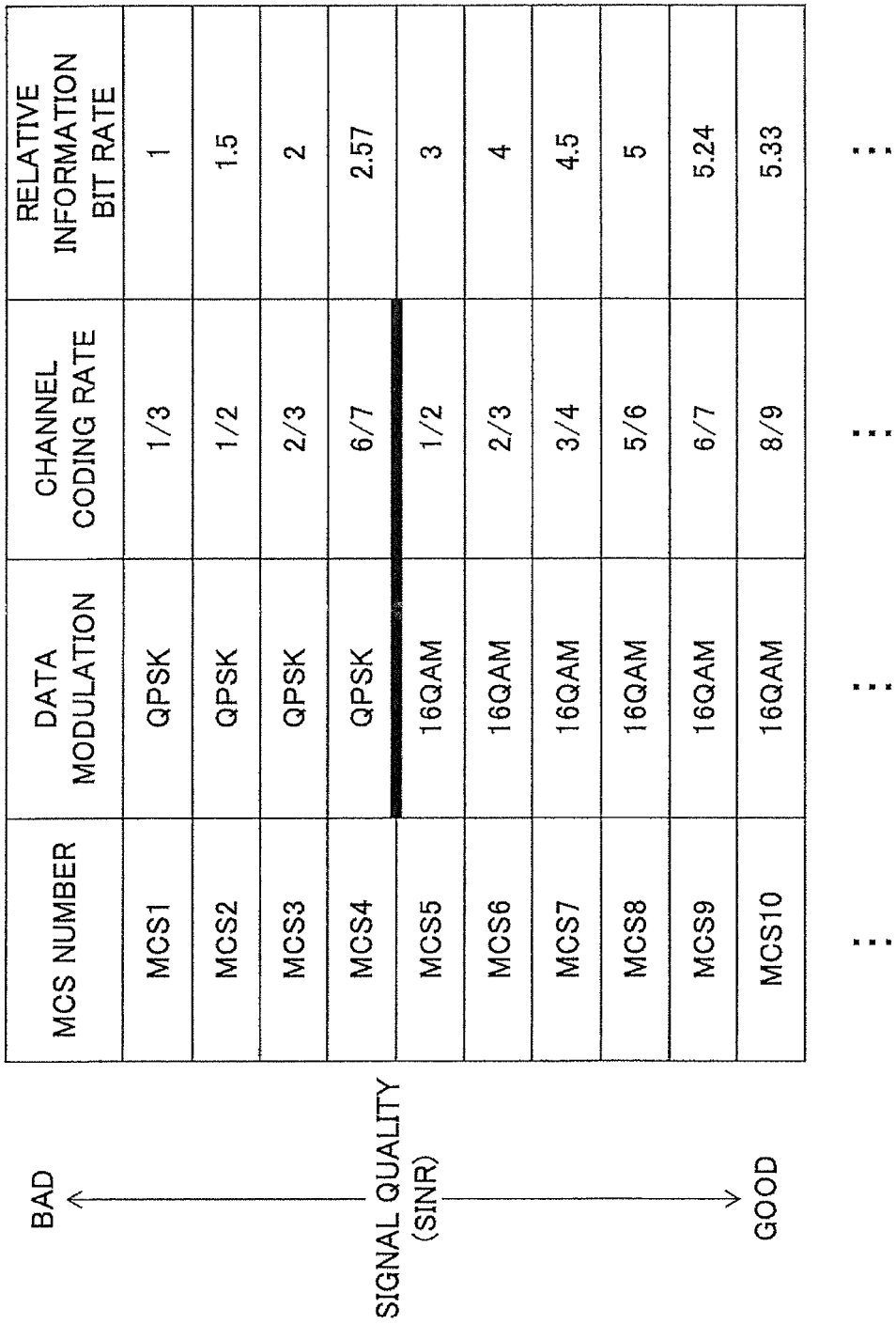
FIG. 4 is a diagram showing an example of combinations of data modulation scheme and channel coding rate.

The data modulation scheme selection unit 52-1 for the first stream determines a data modulation scheme Modulation(1) for the first signal quality q1(1). Correspondence relationship between signal quality, data modulation scheme and channel coding scheme is predetermined as shown in FIG. 4, for example. As shown in FIG. 4 as an example, MCS is arranged in an order of transmission rates, and the channel coding rate is variously changed in a data modulation scheme. That is, transmission rates are largely classified by the data modulation schemes, and further subdivided by channel coding rates. Therefore, even though the first signal qualities q1(1), q1(2) calculated by the MMSE based SINR calculation unit 51 do not have high accuracy, the data modulation scheme can be accurately specified in many cases. As described later, the data modulation scheme determined at this point of time may be changed at a later time under a certain condition.

In the same way, the data modulation scheme selection unit 52-2 for the second stream determines a data modulation scheme Modulation(2) for the first signal quality q1(2).

The SER calculation unit 54-1 for the first stream calculates a second signal quality q2(1) based on the first signal quality q1(1) and the data modulation scheme Modulation(1) prepared in the previous stage. In the present embodiment, the second signal quality q2(1) is represented as an amount indicating interference degree between streams, and is represented as a symbol error rate (SER) as an example. But, the second signal quality may be represented as any proper amount known in the technical field.

FIG. 6 schematically shows relationships between the symbol error rate SER and the signal quality SINR under a data modulation scheme. Such relationship can be accurately prepared empirically or by simulations.

Also, the SER calculation unit 54-2 for the second stream calculates a second signal quality q2(2) based on the first signal quality q1(2) and the data modulation scheme Modulation(2) prepared in the previous stage. In the present embodiment, the second signal quality q2(2) is also represented as a symbol error rate (SER). But, the second signal quality may be represented as any proper amount known in the technical field.

The correction value calculation unit 56-1 for the first stream calculates a correction value Δq(1) for the first stream based on the second quality q2(2) (symbol error rate) for the second stream. In the present embodiment, since the first signal quality q1(1) for the first stream is represented by SINR, the correction value Δq(1) may be represented as ΔSINR(1). The correction value ΔSINR(1) is represented as the following equation.

$$\Delta SINR(1) = \alpha \left( \frac{\|h_1\|^2}{\sigma} - \frac{h_1^H R^{-1} h_1}{1 - h_1^H R^{-1} h_1} \right) \quad (10)$$

The coefficient α of this case is calculated in the following way based on the second signal quality for the second stream.

$$\alpha = \begin{cases} 0 & 0.3 < SER(2) \\ 0.4 & 0.1 < SER(2) \le 0.3 \\ 1.0 & SER(2) \le 0.1 \end{cases} \quad (11)$$

The correction value Δq(1)=ΔSINR(1) calculated in this way and the first signal quality q1(1) are added, so that a third signal quality q3(1) is derived as shown in the following equation.

$$SINR_e(1) = \frac{h_1^H R^{-1} h_1}{1 - h_1^H R^{-1} h_1} + \Delta SINR(1) \quad (12)$$

Although the third signal quality q3(1) may be represented as any proper amount known in the technical field, it is desirable that the third signal quality q3(1) is represented similarly to the first signal quality. In the present embodiment, it is represented using SINR, and is represented as SINRe (equivalent SINR) in connection with equivalent SINR for each stream in the MLD method.

It is not essential that the coefficient α is defined as mentioned above, and the coefficient α may be defined in various ways. For example, the coefficient α to be used for calculation for the first stream may be defined such that it changes according to the data modulation scheme of the second stream. Or, the coefficient α may be defined such that it changes according to radio channel states (represented by an average SNR, for example).

Figure 5B:
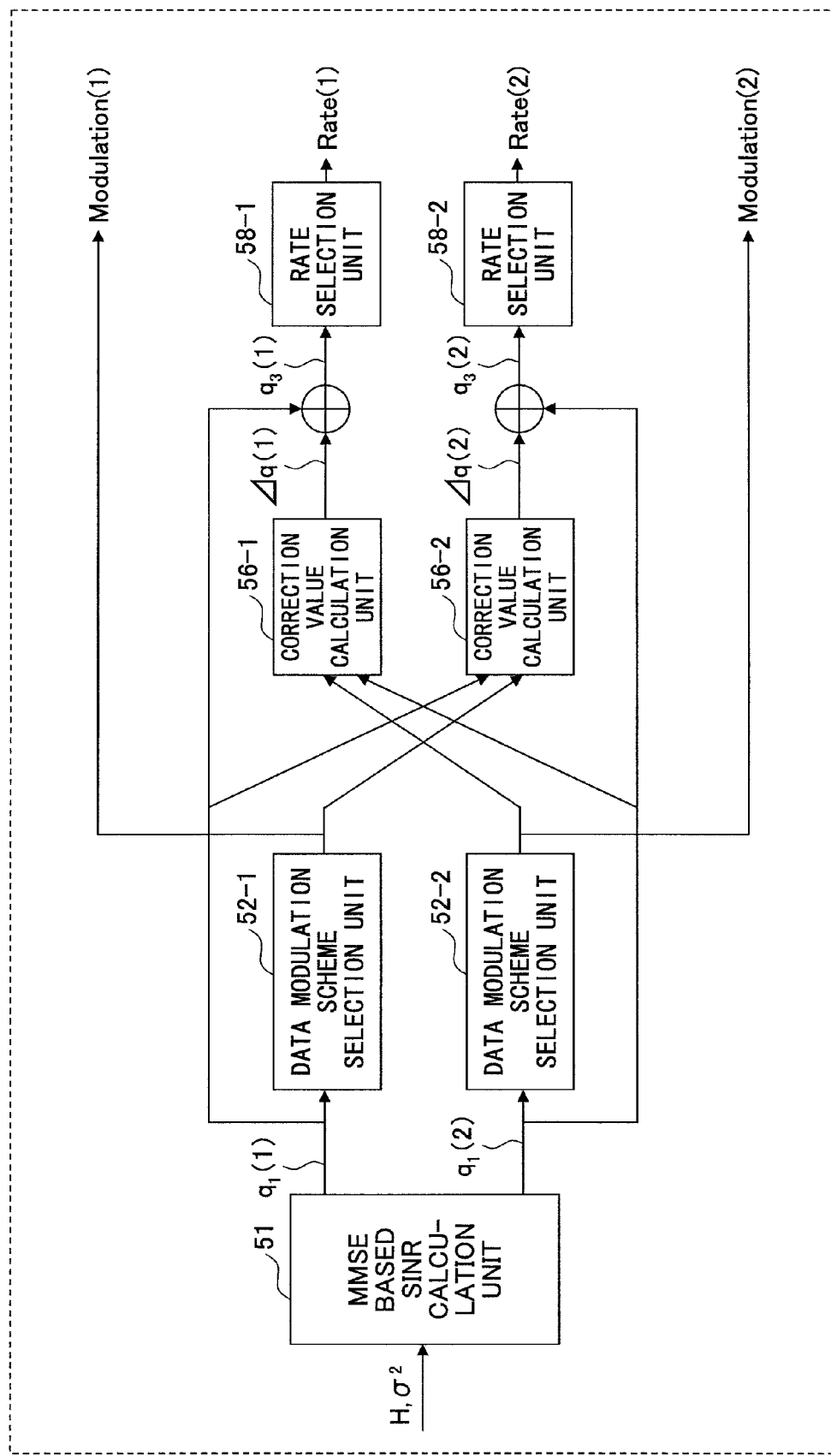
FIG. 5B is a diagram showing a modified example.

In the present embodiment, although SER is calculated as the second communication quality, it is not essential to calculate SER for each stream in the present invention. FIG. 5B is a modified example of FIG. 5A. For example, FIG. 5B shows a MMSE based SINR calculation unit 51, data modulation scheme selection units 52-1 and 52-2, correction value calculation units 56-1 and 56-2, and rate calculation units 58-1 and 58-2. As shown in FIG. 5B, the correction value Δq may be directly derived from the first communication quality q1 and the data modulation scheme by the correction value calculation unit. In this way, the step for calculating SER may be omitted equivalently. p The correction value calculation unit 56-2 for the second stream calculates a correction value Δq(2) for the second stream based on the second signal quality q2(1) (symbol error rate) for the first stream.

The rate calculation unit 58-1 determines a transmission rate based on the third signal quality q3(1) calculated for the first stream. The transmission rate of this case is determined by changing the channel coding rate according to the third signal quality q3(1) under a specific data modulation scheme. For example, it is assumed that MCS is determined as shown in FIG. 4, and that the data modulation scheme of the first stream is determined to be 16 QAM by the first signal quality q1(1). In this case, any one of MCS5~MCS1 is selected. Which one is selected is determined according to the third signal quality q3(1).

The rate calculation unit 58-2 determines a transmission rate based on the third signal quality q3(2) calculated for the second stream.

Figure 3:
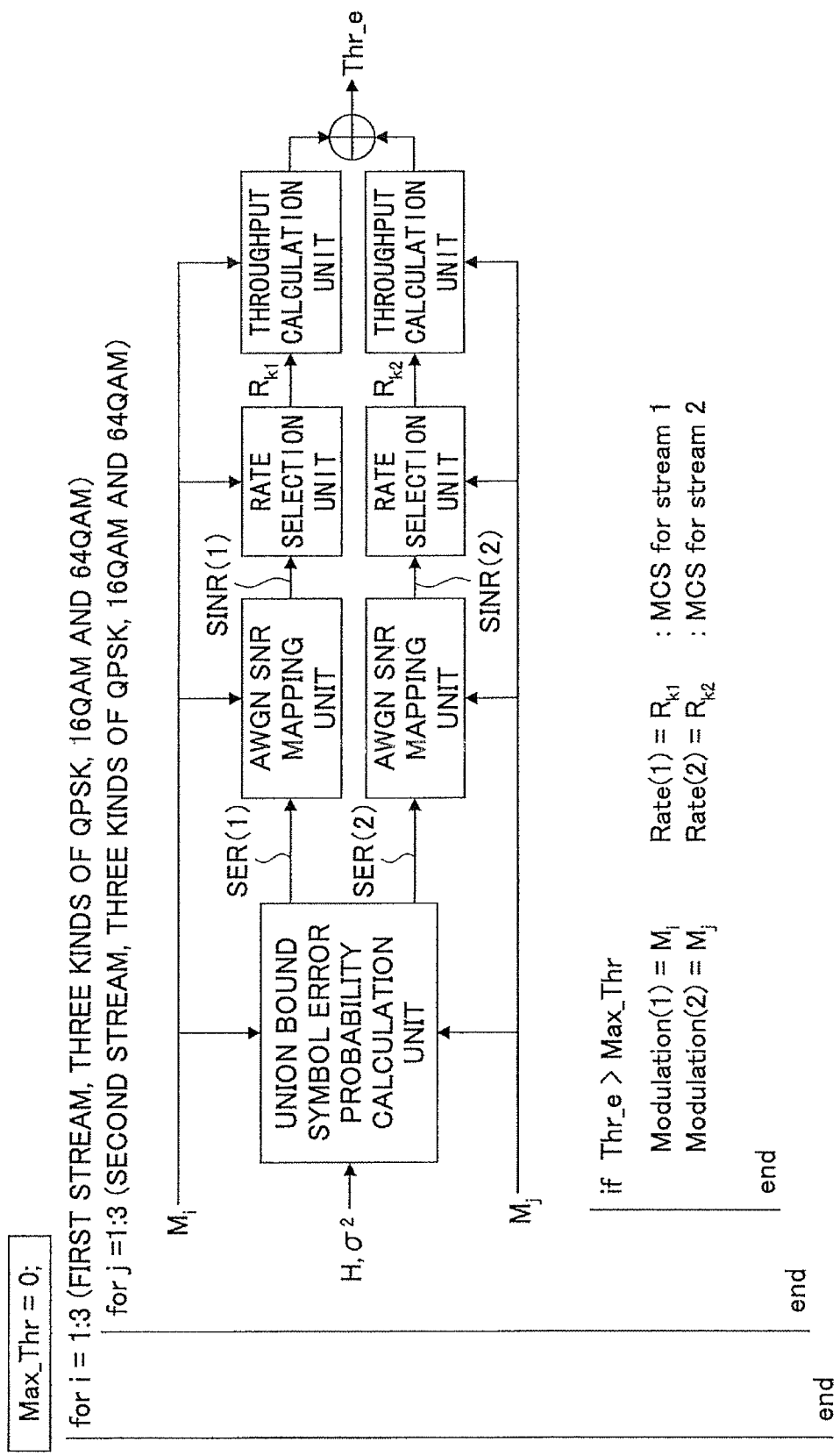
FIG. 3 is a diagram for explaining a conventional method when performing AMC in the MIMO scheme.

Accordingly, the data modulation schemes Modulation(1), Modulation(2) and the channel coding rates Rate(1),Rate(2) can be easily derived without necessity of exhaustive search of all candidates as shown in FIG. 3.

The principle of calculation used in the present embodiment is described. As mentioned above, when receiving two transmission streams, the received signal can be written as follows.

$$r = h_1 s_1 + h_2 s_2 + n$$

This equation is the same as the equation (2). In the case when signal detection is performed by the MLD method, since signals from a plurality of streams are detected collectively, detection accuracy of the first stream $s_1$ depends on detection accuracy of the second stream $s_2$. The second stream $s_2$ becomes an interference stream for the first stream $s_1$. When the symbol error rate q2(2)=SER(2) of the second stream $s_2$ is small so that the second stream can be detected with high quality, interference for the first stream $s_1$ becomes small. Therefore, in a limit of q2(2)=SER(2)→0, the third signal quality SINRe(1) of the first stream $s_1$ can be described as SINRe(1)→$SINR_{free}$=$|h_1|^2/\sigma^2$. Meaning of the symbols is as described before. Since there is some sort of interference in a normal communication state, the third signal quality must be smaller than $SINR_{free}$.

$$SINR_e(1) \leq \frac{\|h_1\|^2}{\sigma^2} \qquad (13)$$

On the other hand, when the second signal quality q2(2)=SER(2) for the second stream $s_2$ is large so that the second stream cannot be detected with high quality, interference to the first stream $s_1$ becomes also large. However, when calculating the signal quality of the first stream, accuracy of the degree obtained by MMSE method should be kept. Therefore, the first signal quality q1=$SINR_{MMSE}$(1) obtained by the MMSE method can be considered to be a lower limit of the third signal quality q3(1)=SINRe(1).

$$SINR_e(1) \geq \frac{h_1^H R^{-1} h_1}{1 - h_1^H R^{-1} h_1} \qquad (14)$$

Considering that the coefficient α is a number between 0 and 1, and that $SINR_{MSSE}$(1)≤$SINR_{free}$, it can be understood that the third signal quality q3(1)=SINRe(1) is between the lower limit value $SINR_{MMSE}$(1) and the upper limit value $SINR_{free}$. Where the third signal quality exists between the lower limit value and the upper limit value is adjusted by the value of the coefficient a. When the second stream can be detected with high quality, q2(2)=SER(2) becomes close to 0, and at this time, the third signal quality q3(1) becomes closer to the upper limit value. On the other hand, when the second stream cannot be detected with high quality, q2(2)=SER(2) becomes large, and at this time, the third signal quality q3(1) becomes closer to the lower limit value. In order to reflect such tendency in the correction value Δq(1), definitions are made as shown in the equations (10) and (11). As mentioned above, since information on the second stream is related to calculation of the equivalent SINR for the first stream, an output destination of each of SER calculation units of the streams is connected to a correction value calculation unit of other stream.

It is not essential to define the coefficient α in the above-mentioned way in the present invention. But, it is preferable to define it in that way from the viewpoint of reflecting the property or tendency easily.

By the way, the equation (12) can be transformed to the following equation.

$$SINRe(1)=(1-\alpha) \times SINR_{MMSE}(1)+\alpha \times SINR_{free}, \ 0\leq\alpha\leq1 \qquad (15)$$

From this viewpoint, it can be also said that SINRe(1) is derived as a weighted average value of $SINR_{MMSE}$(1) and $SINR_{free}$.

Although the above explanation is related to the first stream, similar explanation applies also to the second stream.

All or a part of functional components shown in FIG. 5A may be provided in the user apparatus. In the latter case, for example, the MMSE based SINR calculation unit 51 may be prepared in the user apparatus, and other functional components are prepared in the base station apparatus. Or, in the case of uplink, all of the functional components shown in the figure may be provided in the base station apparatus. It is preferable that all of the components shown in the figure are provided in the user apparatus from the viewpoint of determining proper MCS quickly. It is preferable to provide a part of the functional components in the base station apparatus from the viewpoint of saving battery and calculation resources of the user apparatus.

Figure 7:
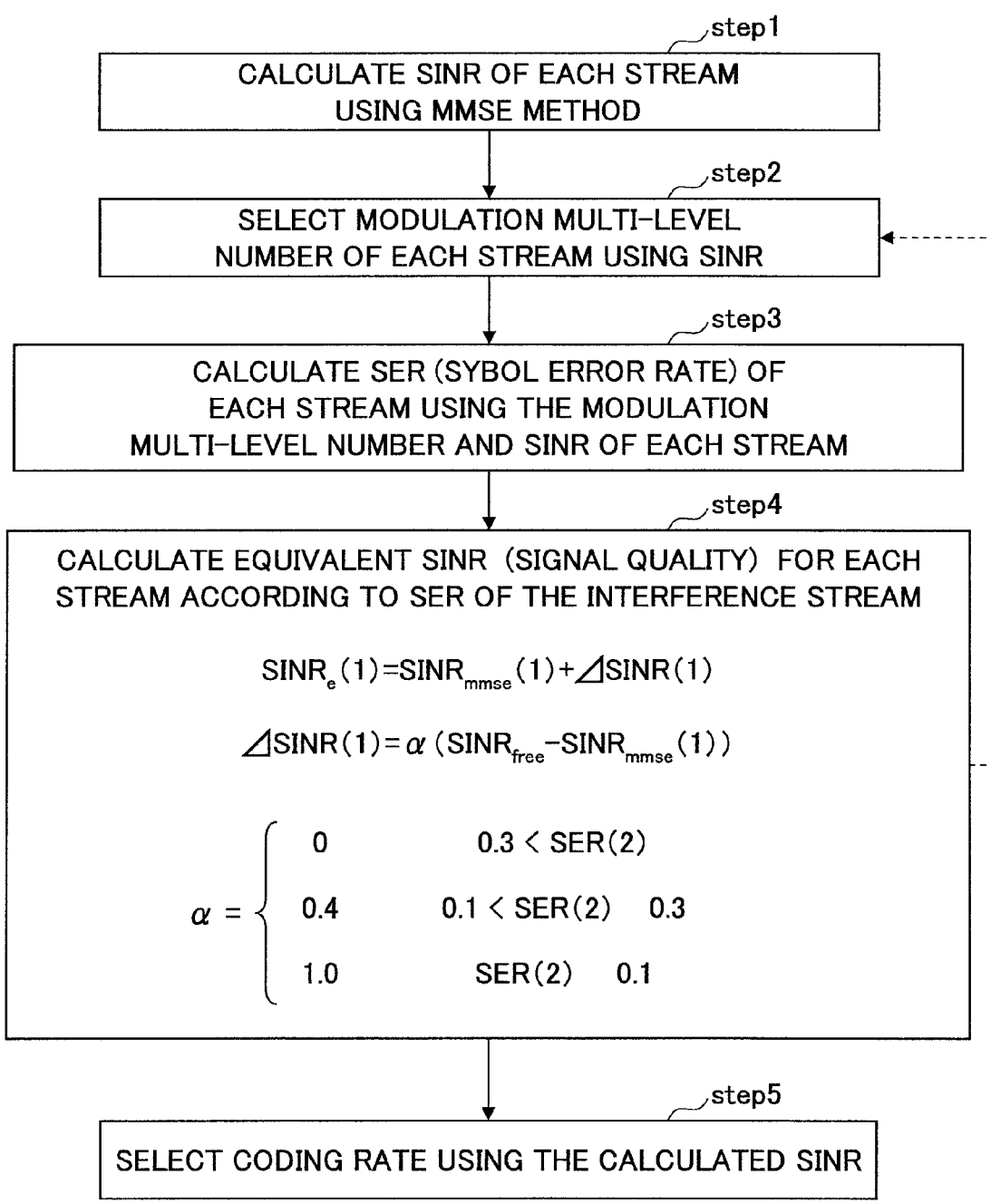
FIG. 7 is a flowchart showing an operation example of the first embodiment.

FIG. 7 shows a flowchart of an operation example of an embodiment of the present invention. First, the first signal quality q1 (SINR in the above example) of each stream is calculated using the MMSE method (step 1). Next, a data modulation scheme is selected for each stream using the calculated first signal quality q1 (step 2). Next, the second signal quality q2 (symbol error rate (SER) in the above example) of each stream is calculated based on the data modulation scheme and the first signal quality q1 (step 3). Next, the third signal quality q3 (SINRe in the above example) is calculated using information of the interference stream for each of streams (step 4). Then, the channel coding rate is determined based on the calculated third signal quality q3, so that MCS is finally determined.

By the way, the third signal quality q3 is obtained by adding the correction value Δq to the first signal quality q1, and q3 is a value equal to or greater than q1.

$$q3=q1+\Delta q \geq q1$$

A case where q3 becomes greater than q1 means that the proper data modulation scheme may change if the signal quality is corrected by the correction value (refer to FIG. 1). In the case of the example of FIG. 1, although the proper data modulation scheme before correction is 16 QAM, the proper data modulation scheme after correction corresponding to q3 is 64 QAM. If such a circumstance is revealed in step 4 of the flow shown in FIG. 7, the flow returns to step 2, so that the modulation multi-level number on the stream is increased, and the similar procedure is repeated. As mentioned above, in the MLD method, detection accuracy of a stream depends on detection accuracy of other stream (interference stream). Therefore, when the data modulation scheme is changed for a stream, interference effect exerted on other stream also changes. For example, when the data modulation scheme of the first stream of FIG. 5A is changed, a second signal quality q2(1) derived from the changed data modulation scheme is input to the correction value calculation unit 56-2 of the second stream. As a result, the third signal quality q3(2) for the second stream also changes, so that the channel coding rate for the second stream selected in the rate selection unit 58-2 may also changed. In ordinary cases, when a modulation multi-level number of a stream is increased, interference to be exerted to other stream increases, so that there is a case where the modulation scheme or the coding rate of other stream needs to be decreased. Therefore, it is desirable to finally determine optimal combination of modulation scheme and coding rate in consideration of deterioration of throughput due to the above-mentioned circumstances.

[Embodiment 2]

It is not essential that MCS is set for each of the plurality of streams. For example, the same data modulation scheme and the same channel coding rate may be used for two streams.

Figure 8:
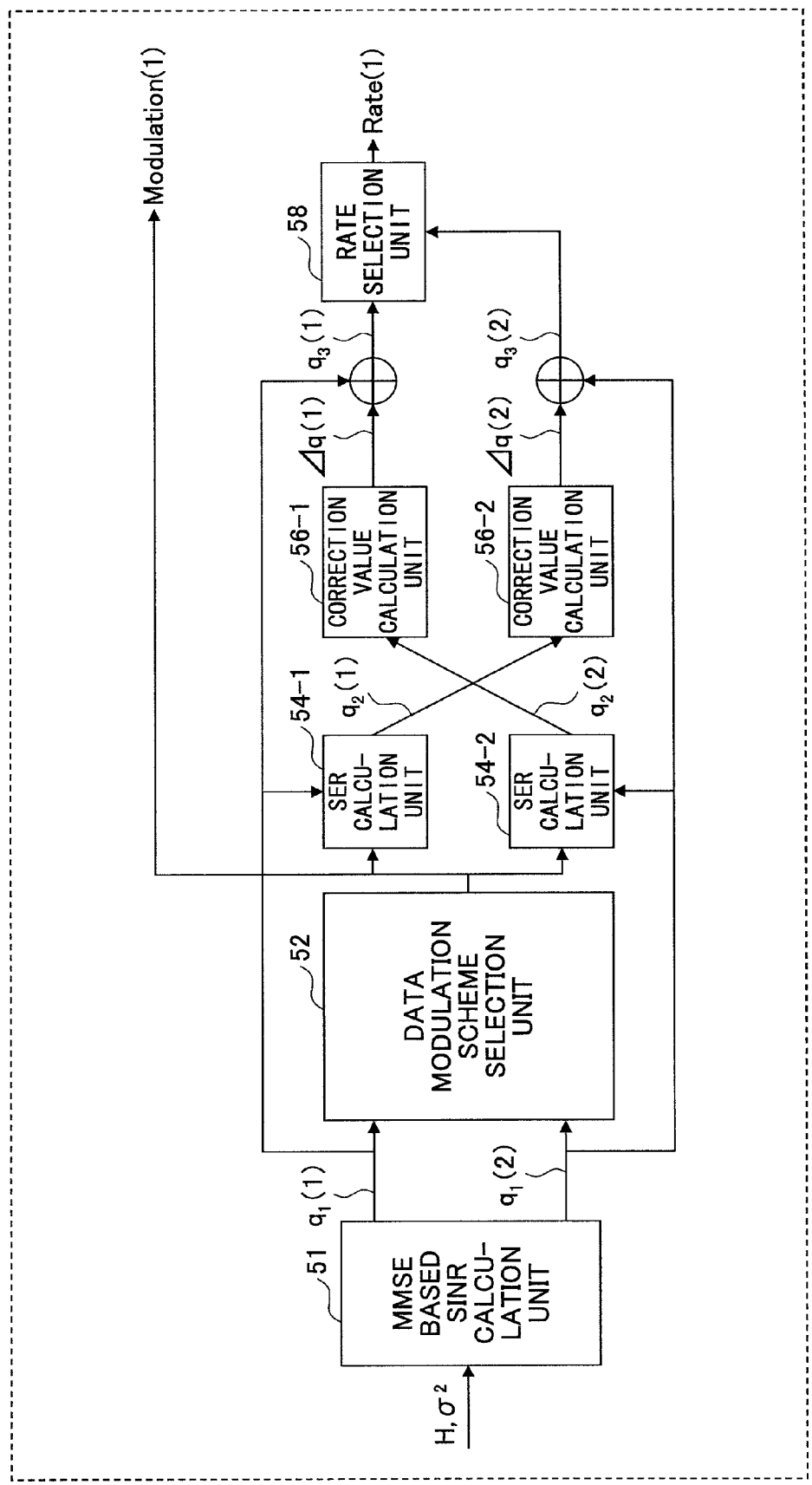
FIG. 8 is a diagram showing a link adaptation unit of a communication apparatus of a second embodiment.

FIG. 8 shows a link adaptation unit of the communication apparatus of the second embodiment prepared from this viewpoint. Generally, although FIG. 8 is almost the same as FIG. 5A, FIG. 8 is different from FIG. 5A in that one data modulation scheme selection unit 52 is commonly used for two streams and that one rate selection unit 58 is commonly used for two streams. However, calculation of the second signal qualities q2(1),q2(2) and calculation of the correction values Δq(1),Δq(2) are performed by identifying each stream in the same way as the case of FIG. 5A. As mentioned above, the reason is that there is a relationship in which each stream exerts interference to other stream.

When processing such as interleaving between transmission streams is performed in the transmission side, quality of a plurality of streams becomes similar. In such a system, information amount (overhead) required for feedback can be reduced by performing average link adaptation without performing link adaptation for each stream.

[Embodiment 3]

Figure 9:
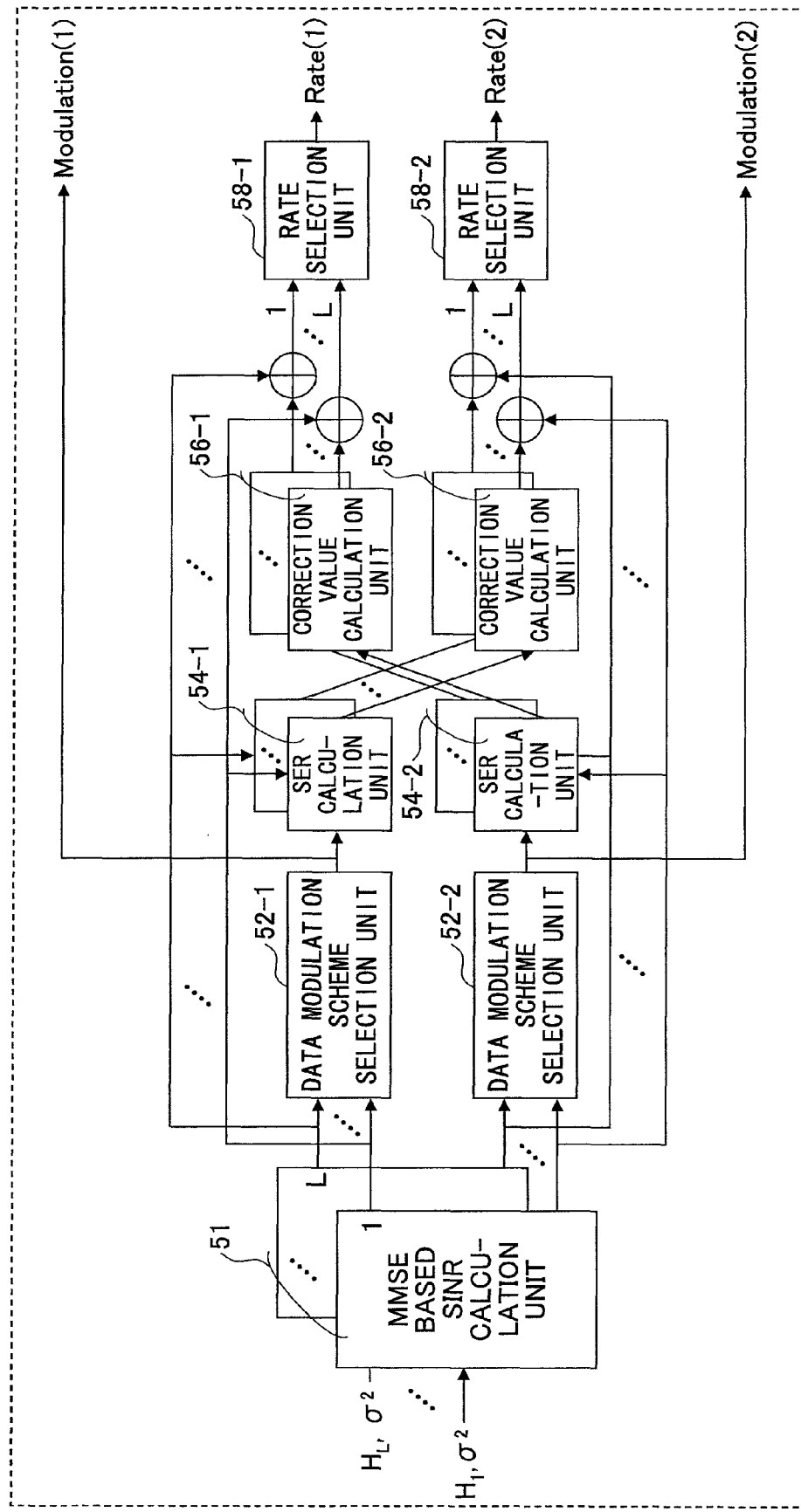
FIG. 9 is a diagram showing a link adaptation unit of a communication apparatus of a third embodiment.

FIG. 9 shows a link adaptation unit of the communication apparatus of the third embodiment. In the present embodiment, an orthogonal frequency division multiplexing (OFDM) scheme is used in addition to the MIMO scheme and the AMC scheme. In the example shown in the figure, although processing for L subcarriers is shown, it is assumed that these subcarriers are included in a frequency band (equal to or more than one resource block) assigned to a user apparatus. The configuration components in the figure are similar to those described with reference to FIG. 5A in general, but the one shown in FIG. 9 is different from the one shown in FIG. 5A in that processing is performed for each subcarrier except for the data modulation scheme selection units 52-1, 52-2 and the rate selection units 58-1,58-2.

The MMSE based SINR calculation unit 51 prepares the first signal quality which is SINR for each stream and for each subcarrier. The reason is that, strictly speaking, the channel state of the radio propagation route varies for each subcarrier.

The data modulation scheme selection unit 52-1 for the first stream receives the first signal quality of L subcarriers for the first stream so as to select a data modulation scheme Modulation(1). The technology for obtaining one piece of average mutual information (MI) from SINR of each of L various subcarriers and deriving a data modulation scheme from the average MI is described in the following document, for example.

3GPP, R1-060987, NTT DoCoMo, Ericsson, Fujitsu, Mitsubishi Electric, NEC, Panasonic, Sharp, Toshiba, "Link Adaptation Scheme for Single-antenna Transmission in E-UTRA Downlink"

One data modulation scheme is selected per stream. But, the second signal quality q2 and the correction value are calculated for each subcarrier, and the third signal quality q3 is also prepared for each subcarrier. Each of the rate selection units 58-1, 58-2 selects a combination of a data modulation scheme and a channel coding rate based on the third signal quality q3 prepared for each of these subcarriers. Accordingly, the data modulation scheme Modulation(1)and the channel coding rate Rate(1)for the first stream, and the data modulation scheme Modulation(2)and the channel coding rate Rate(2)for the second stream are prepared.

[Embodiment 4]

In the embodiments 1-3, the data modulation scheme selection unit (52-1,52-2 in FIG. 5A) uniquely derives a data modulation scheme from the SINR after MMSE processing, and after that, the data modulation scheme is fixed in principle. When there are N data modulation schemes that can be used for the first and second streams respectively, there are $N^2$ combinations of all possible data modulation schemes when the number of streams is 2. It can be predicted that a combination of data modulation schemes derived from SINR from among the $N^2$ combinations is likely to a large degree. However, it is difficult to say that all of the other $N^2-1$ combinations are always improper. From such viewpoint, in the fourth embodiment of the present invention, the combination of data modulation schemes of each stream is not fixed to one, and other combinations are considered.

Figure 10:
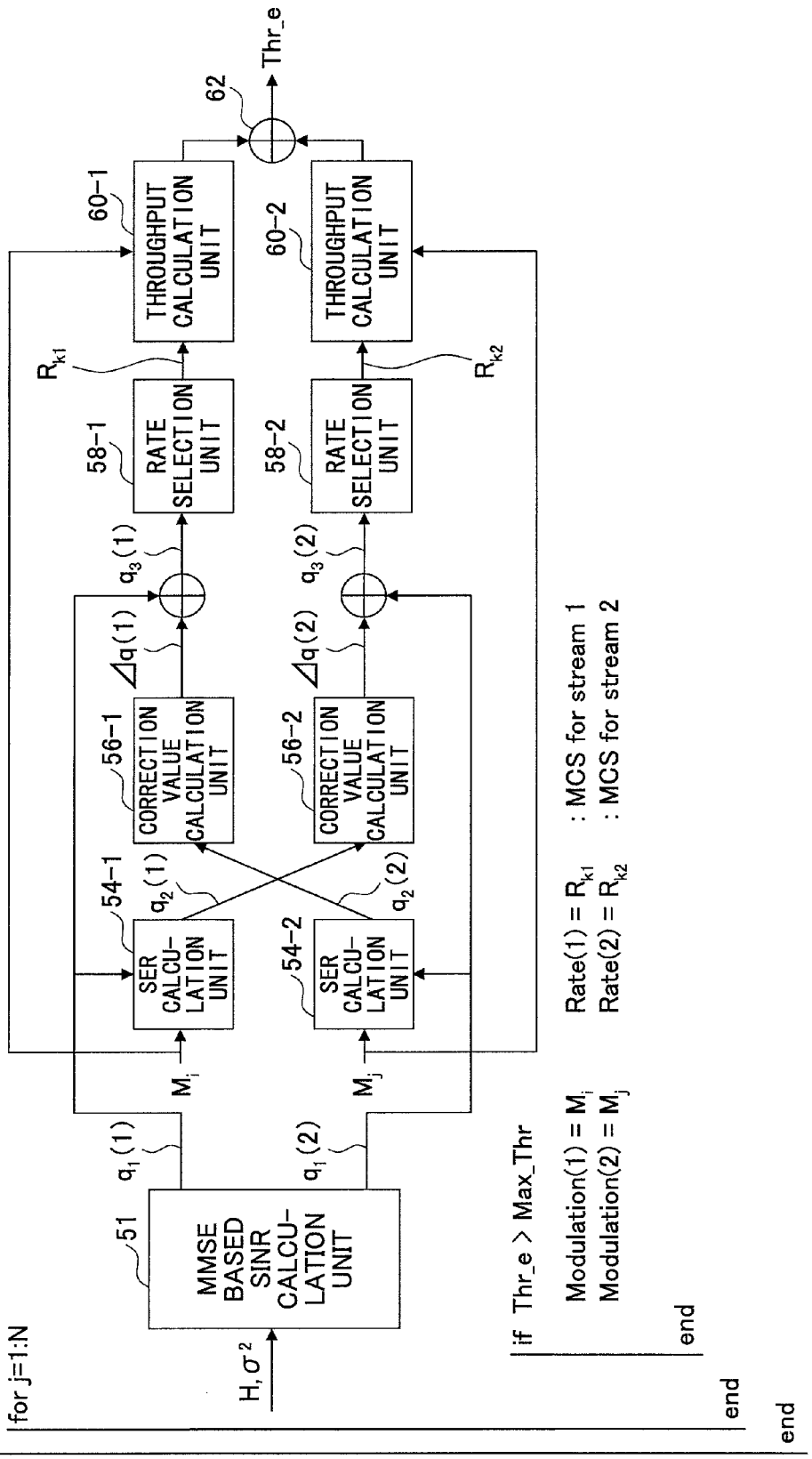
FIG. 10 is a diagram showing a link adaptation unit of a communication apparatus of a fourth embodiment.

FIG. 10 shows a link adaptation unit of the communication apparatus in the fourth embodiment. In general, FIG. 10 is similar to FIG. 5A, and the same components are assigned the same reference numbers. In the present embodiment, since every combination of data modulation schemes of each stream is considered, the data modulation scheme selection units 52-1 and 52-2 shown in FIG. 5A are not shown. However, a processing unit like the data modulation scheme selection unit may exist, and a processing unit for providing a combination (M1$i$,M2$i$) of data modulation schemes to the SER calculation unit may exist. Different from FIG. 5A, FIG. 10 shows throughput calculation units 60-1 and 60-2 and a combining unit 62 after the rate selection units 58-1 and 58-2. In the present embodiment, the combination of data modulation schemes and the corresponding coding rates are determined such that total throughput Thr_e of throughputs of each stream becomes maximum.

More particularly, a plurality of candidates of a pair (Mi, Mj) of data modulation schemes of each stream are prepared beforehand. In order to simplify the explanation, the case of two streams is assumed. As is clear from the context, "combination of data modulation schemes" and "pair of data modulation schemes" are used synonymously. Calculation of the symbol error rate SER, the correction value ΔSINR and channel coding rate and the like that have been explained in embodiments 1-3 is performed for each of combinations of data modulation schemes, and a pair of data modulation schemes and corresponding channel coding rates are finally selected such that total throughput of the two streams becomes the highest, and they are used for actual communication after that.

For example, when there are three choices of QPSK, 16 QAM and 64 QAM as the data modulation schemes of each stream, the total number of combinations of data modulation schemes of two streams is 9. The calculation of the correction value ΔSINR and the channel coding rate and the like explained in the embodiments 1-3 is performed for all of the 9 combinations. In the figure, "for i=1:3 . . . end" indicates performing calculation repeatedly while changing the variable i of the data modulation scheme Mi for the first stream to 1, 2 and 3, and "for j=1:3 . . . end" indicates performing calculation repeatedly while changing the variable j of the data modulation scheme Mj for the second stream to 1, 2 and 3. K kinds of channel coding rates ($R_1,R_2, \ldots ,R_K$) are prepared.

In this example, although calculation is required for all of the 9 combinations, calculation load of the present embodiment is still low compared to the conventional technique since the conventional calculation (FIG. 3) of the symbol error rate of union bound is unnecessary until deriving the channel coding rate from the data modulation scheme of each stream. According to the present embodiment, since throughput is checked for all of the plurality of data modulation scheme pairs, flexibility of selection of the data modulation scheme is wide, so that it can be expected to achieve high throughput with reliability.

[Embodiment 5]

In the fourth embodiment, calculation for obtaining throughput of each stream is performed for all of $N^P$ combinations of data modulation schemes when the number of streams is P. In the fifth embodiment of the present invention, calculation load is reduced by decreasing the number of combinations to be considered.

Figure 11:
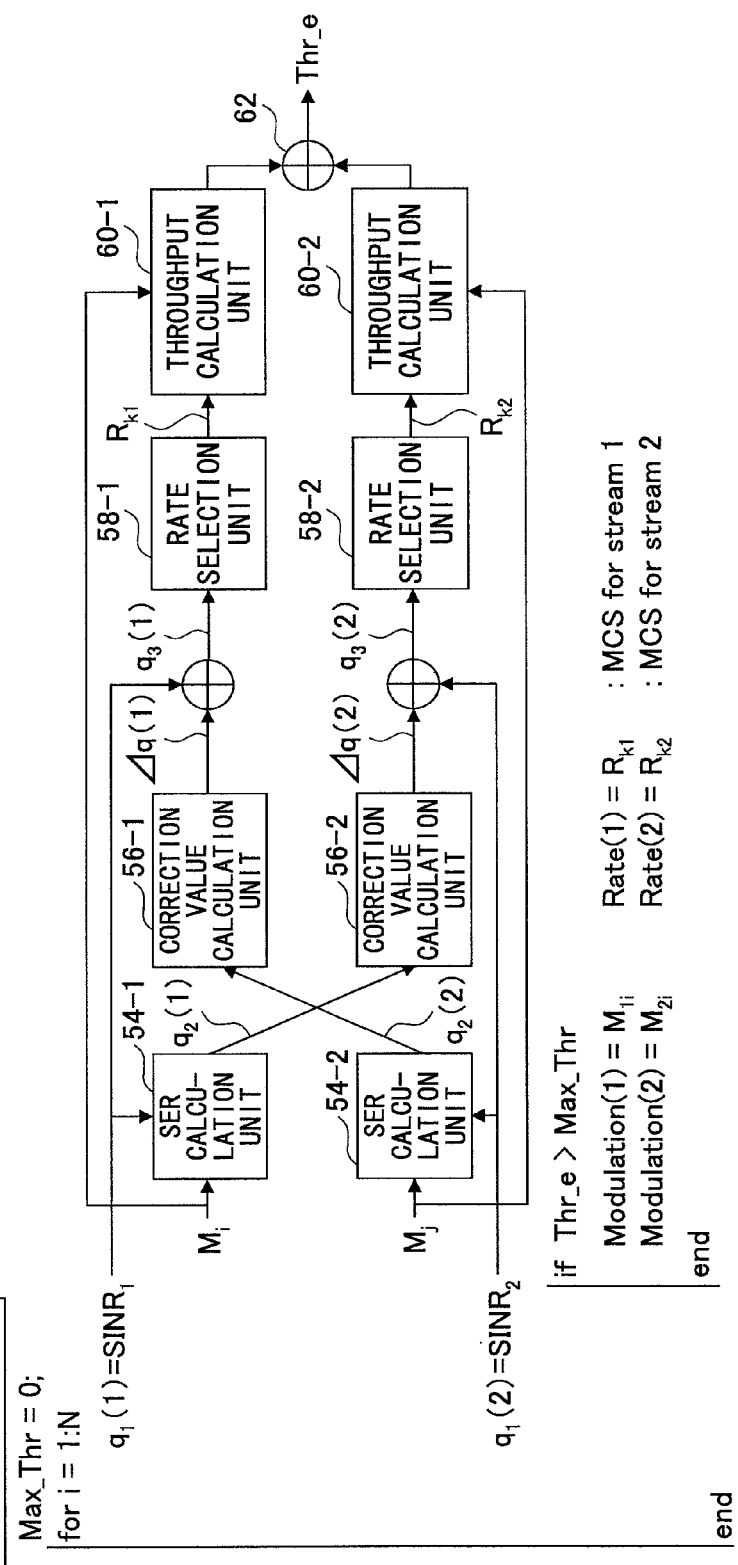
FIG. 11 is a diagram for explaining operation according to a fifth embodiment.

FIG. 11 shows two steps performed in the fifth embodiment and shows process contents in each step. In the present embodiment, processing of two stages of steps 1 and 2 are performed.

In step 1, combinations of data modulation schemes are narrowed. For performing this processing, first, signal quality of each stream received via a radio propagation route is calculated. Similarly to the case of the first embodiment, the signal quality may be calculated by the MMSE based SINR calculation unit 51. The signal qualities may be represented as the desired signal power to undesired power ratios $SINR_{MMSE}$(1) and $SINR_{MMSE}$(2) like equations (4) and (5) described in the first embodiment. The signal quality may be represented as any amount known in the technical field. Like the case of the first embodiment, the signal quality $SINR_{MMSE}$(1) calculated for the first stream is referred to as a first signal quality q1(1)(or first reference signal quality q1(1)). The signal quality $SINR_{MMSE}$(2) calculated for the second stream is referred to as a first signal quality q1(2)(or first reference signal quality q1(2)). In this embodiment, the method for preparing the first signal qualities q1(1),q1(2) for each stream is the MMSE method. But, this is not essential for the present invention. Any proper method known in the technical field may be used.

Next, a combination of data modulation schemes is determined. This determination is performed by the modulation scheme set determination unit 111. The modulation scheme set determination unit 111 receives the first signal qualities q1(1) and q1(2) from the MMSE based SINR calculation unit 51, and prepares combinations of data modulation schemes of the first and the second streams ($M_{11},M_{21}$), ($M_{12},M_{22}$), . . . , ($M_{1N},M_{2N}$). The procedure of step 2 may be performed after all of these combinations are prepared, or a combination may be prepared at each time when it is necessary in the procedure of step 2. For the sake of explanation, although the total number of combinations is shown as N, any proper number of combinations less than $N^2$ may be prepared (N is the number of data modulation schemes that may be used for each stream).

In step 2, MCS that is a combination of a data modulation scheme and a channel coding rate is determined, and the MCS is used for communication after that. After the combination (M1$i$,M2$i$) of the data modulation schemes is determined, the processing for calculating the correction value, the channel coding rate and throughput and the like is the same as that described in the fourth embodiment.

In the step 1, a concrete example of a method is described below for preparing less than the possible total number ($N^2$) of combinations (M1$i$,M2$i$) of the data modulation schemes from the first signal qualities q1(1) and q1(2) of each stream.

Figure 12:
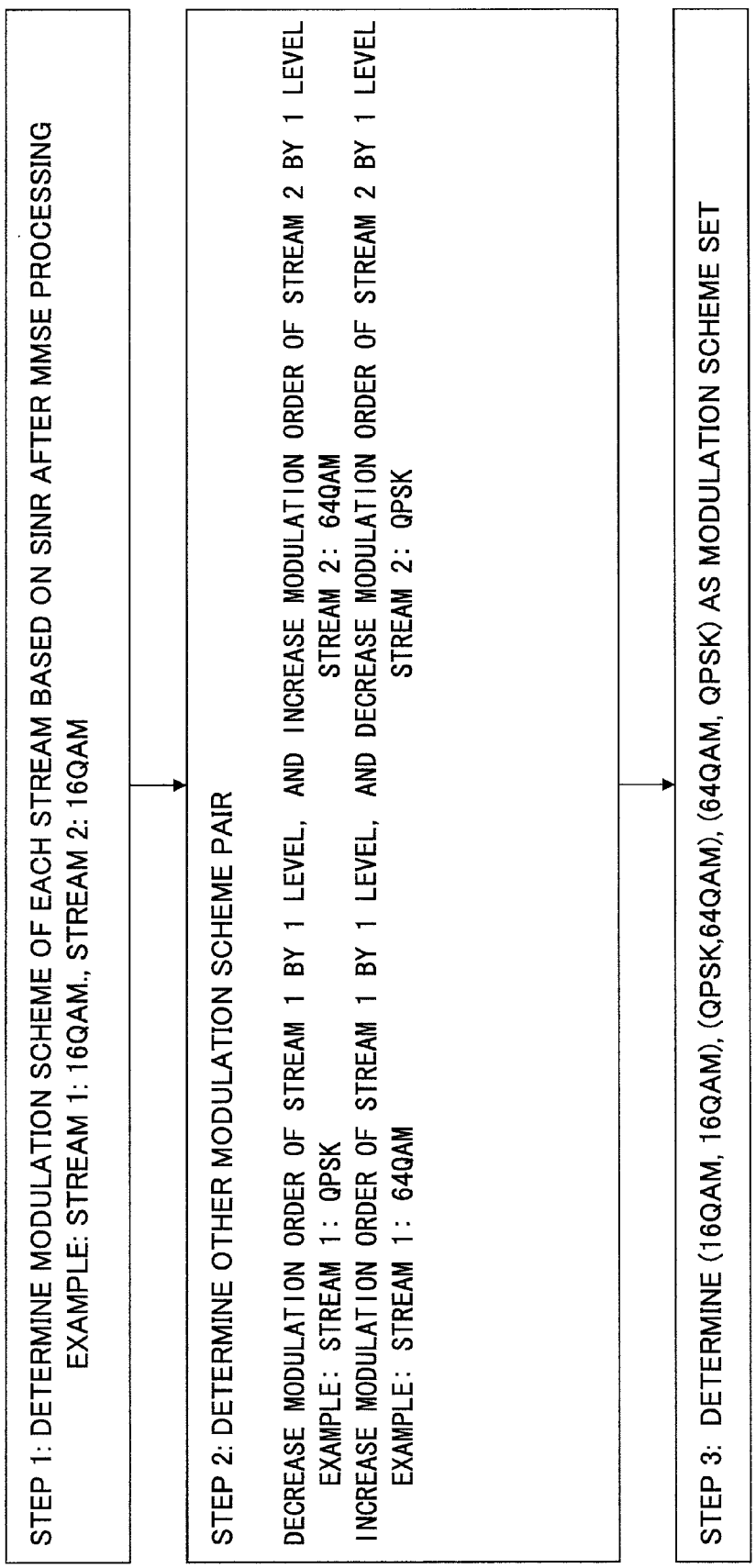
FIG. 12 is a diagram showing a method example for preparing combinations of data modulation schemes for first and second streams.

FIG. 12 shows an example of a method for preparing the combinations of the data modulation schemes. This method is typically performed in the modulation scheme set determination unit 111 shown in FIG. 11.

In step 1, a combination of data modulation schemes that becomes a reference is determined. As mentioned above, the MMSE based SINR calculation unit 51 (FIG. 11) calculates signal quality of each of the first and the second streams. For example, the first signal quality q1(1)=$SINR_{MMSE}$(1) is calculated for the first stream, and the second signal q1(2)=$SINR_{MMSE}$(2) is calculated for the second stream. Since correspondence relationship between the signal quality and the data modulation scheme/coding rate is known, data modulation schemes can be derived from the first signal qualities q1(1) and q1(2) respectively. The pair of the data modulation schemes is referred to as a "reference pair" as a matter of convenience. Each of the data modulation schemes included in the reference pair may be referred to as "main candidate" of a plurality of data modulation schemes. In the example shown in FIG. 12, 16 QAM is derived for the first stream, and also 16 QAM is derived for the second stream. Therefore, the reference pair is represented as (16 QAM,16 QAM). The main candidate is 16 QAM.

In step 2, one or more secondary pair is derived from the reference pair. A method for deriving the secondary pair is to decrease the modulation order of the first stream of the reference pair by 1 level, and to increase the modulation order of the second stream by 1 level. In the present example, the reference pair is (M1,M2)=(16 QAM,16QAM), and the secondary pair is (M1,M2)=(QPSK,64 QAM).

Another method for deriving the secondary pair is to increase the modulation order of the first stream of the reference pair by 1 level, and decrease the modulation order of the secondary stream by 1 level. In the present example, the reference pair is (M1,M2)=(16 QAM,16 QAM), and the secondary pair is (M1,M2)=(64 QAM,QPSK).

QPSK or 64 QAM derived from the main candidate 16 QAM in the reference pair may be called "sub-candidate".

In step 3, the reference pair and the secondary pair prepared in step 2 are prepared as combination candidates of the data modulation schemes. As to these combination candidates, throughput and the like are calculated in step 2 of FIG. 11.

As to a combination candidate that does not correspond to the reference pair nor the secondary pair in step 2, throughput and the like are not calculated in step 2 of FIG. 11. In this example, the total number of possible combinations of data modulation schemes for the first and the second streams is 9. According to the present embodiment, calculation of throughput and the like are performed only for three combinations of (M1,M2)=(16 QAM,16 QAM), (QPSK,64 QAM) and (64 QAM,QPSK) in the 9 combinations, and the calculation is not performed for other combinations. Accordingly, calculation load is reduced.

In the above example, the secondary pair is derived by increasing/decreasing the modulation order of the reference pair by 1 level. From the viewpoint of deriving a pair from the reference pair, the main candidate (16 QAM) of the first stream of the reference pair is kept unchanged, and the modulation order of the second stream may be increase/decreased. In this case, combinations of (M1,M2)=(16 QAM,16 QAM), (16 QAM,QPSK) and (16 QAM,64 QAM) are obtained. When the main candidate (16 QAM) of the second stream of the reference pair is kept unchanged, and the modulation order of the first stream is increase/decreased, combinations of (M1,M2)=(16 QAM,16 QAM), (QPSK,16 QAM) and (64 QAM,16 QAM) are obtained. Accordingly, by increasing/decreasing the modulation order of the main candidate of the reference pair, a sub-candidate can be derived.

By the way, to decrease the modulation order of the first stream leads to decreasing the rate of the first data stream, which means that throughput of the first data stream decreases, but, conversely, it improves signal quality of the first stream. When the signal quality of the first stream improves, interference exerted to the second stream decreases. As a result, it can be expected that the signal quality of the second stream also improves. Therefore, the modulation order of the second stream may be increased. By increasing the modulation order of the second stream, throughput of the second stream improves. It is assumed that a secondary pair is prepared by increasing the modulation order of the second stream while decreasing the modulation order of the first stream. In this case, throughput of the first stream decreases, but, since throughput of the second stream improves, it can be predicted that throughput obtained by putting together the first and the second streams does not change largely. Therefore, from the viewpoint of deriving the secondary pair based on the reference pair while maintaining achievable throughput to the same extent, it is preferable to increase the modulation order of one of the main candidates in the reference pair so as to prepare a sub-candidate, and to decrease the modulation order of another of the main candidates of the reference pair so as to prepare another sub-candidate, as mentioned above. In addition, in the above example, although the modulation order is increased/decreased by one level, it may be increased/decreased by a plurality of levels.

[Embodiment 6]

In the embodiments 1-5, the first signal quality q1 is used for calculating the symbol error rate SER and the signal quality q3=q1+Δq (FIGS. 5A, 5B, 8, 9 and 11). The first signal quality q1 in this case is an amount calculated by the MMSE based SINR calculation unit 51, and is a lower limit value of the signal quality. However, it is not essential to use the lower limit value as the first signal quality q1 when calculating the symbol error rate SER and the signal quality q3=q1+Δq. Rather, it can be expected that accuracy of SER and q3 improves by improving accuracy of the first signal quality q1. In the sixth embodiment of the present invention, a value improved from the lower limit value is used as the first signal quality q1 for calculating SER and q3, so that accuracy of calculation is obtained.

Figure 13:
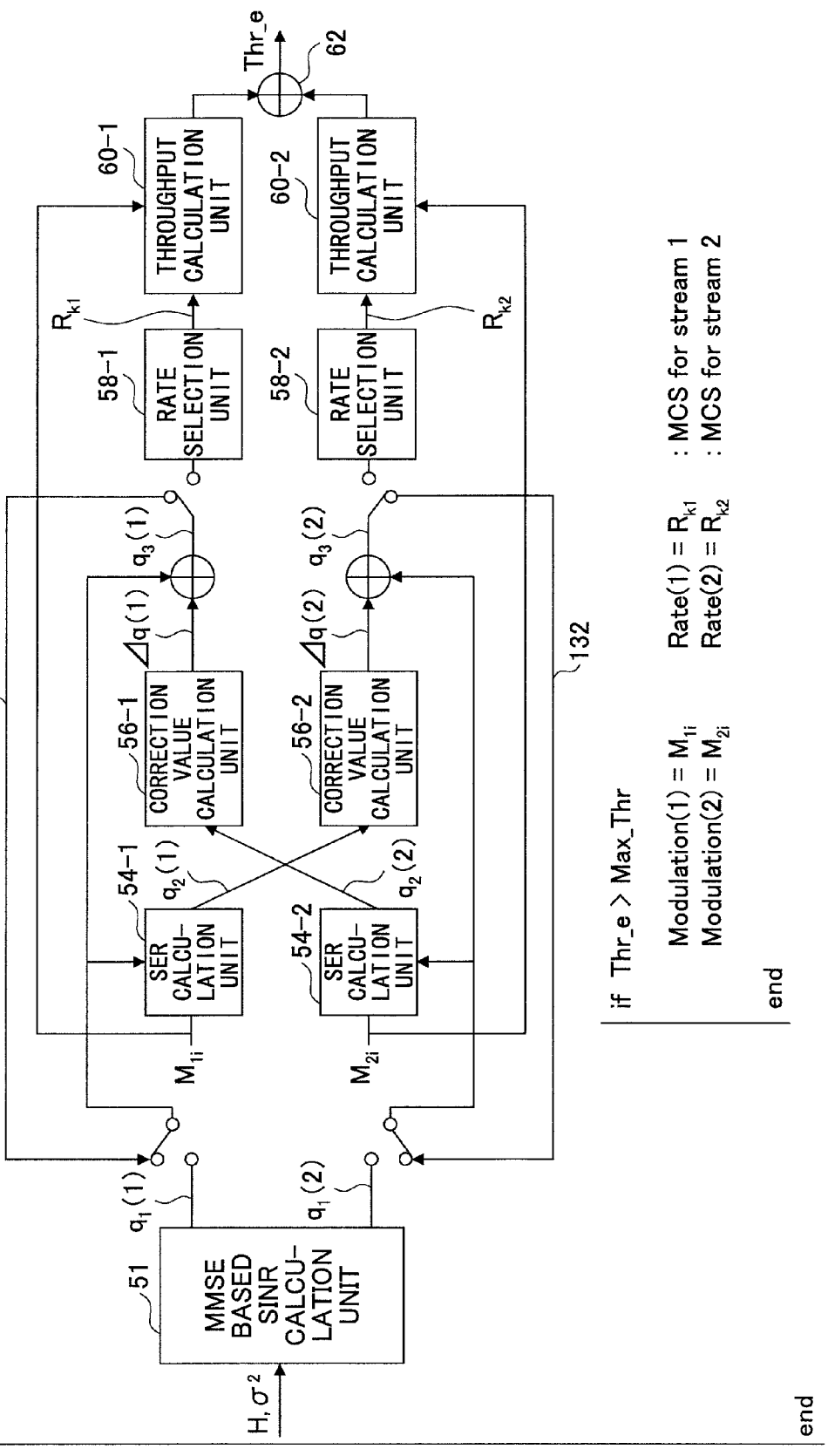
FIG. 13 is a diagram showing a link adaptation unit of a communication apparatus of a sixth embodiment.

FIG. 13 shows a link adaptation unit of the communication apparatus of the present embodiment. In general, FIG. 13 is similar to FIGS. 5A and 10, and the same components are assigned the same reference numbers. In the present embodiment, when performing repetition calculation, the third signal quality q3=q1+Δq is fed back to the SER calculation unit 54 and a combining unit for outputting q3 via feed back routes 131 and 132. In the initial calculation in the repetition, the signal quality q1=SINR from the MMSE based SINR calculation unit is input to the SER calculation unit 54 and the combining unit for outputting q3. Once the third signal quality q3 is calculated, q3 is supplied to the SER calculation unit 54 and the combining unit, so that calculation is performed repeatedly after that.

Figure 14:
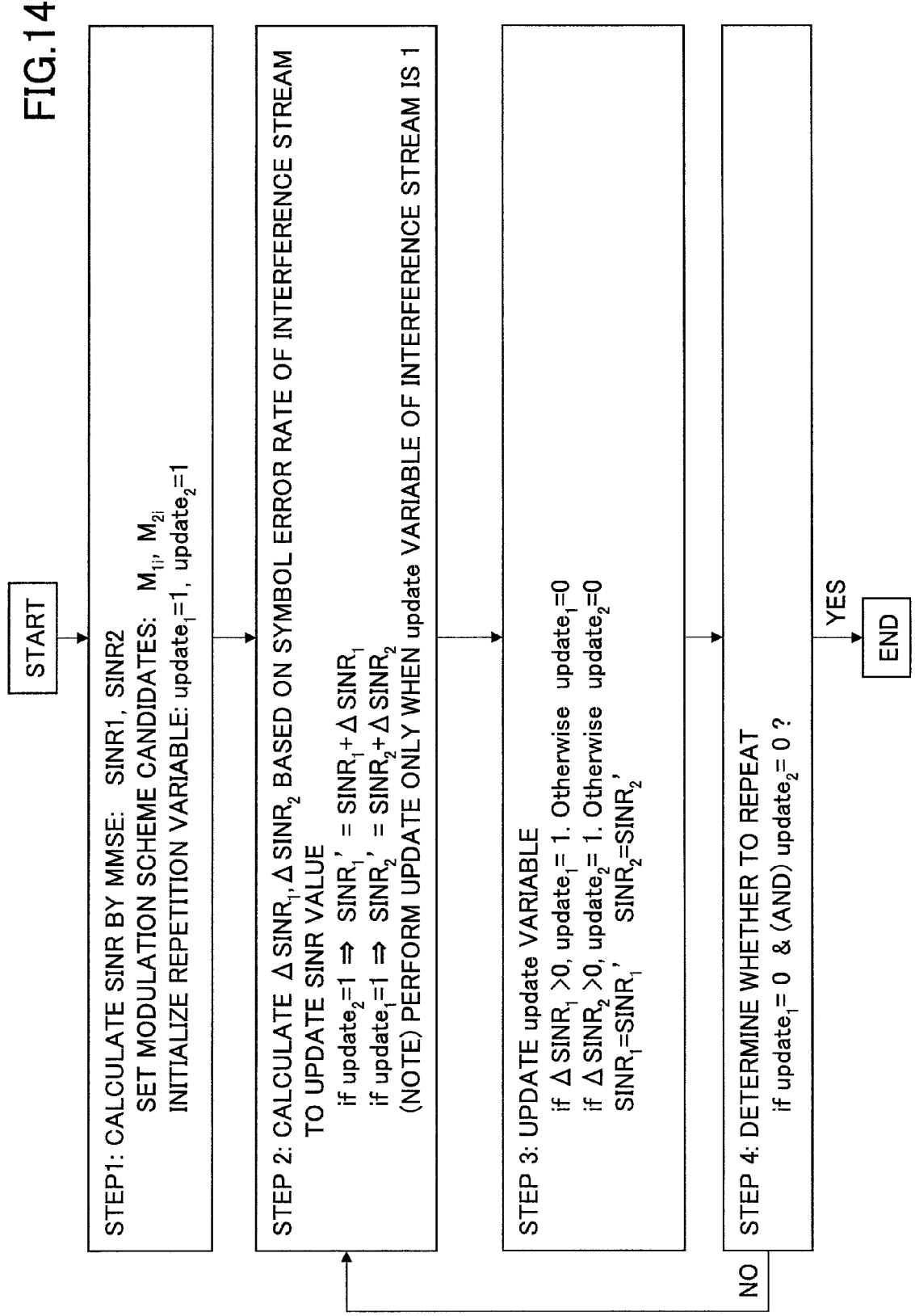
FIG. 14 shows a flowchart of an operation example used in the sixth embodiment.

FIG. 14 shows an operation example used in the present embodiment. In step 1, the MMSE based SINR calculation unit 51 calculates initial values of the signal qualities q1(1) and q1(2) for each of the first and the second streams. For the sake of explanation, it is assumed that q1(1)=SINR1 and q1(2)=SINR2. In step 1, data modulation schemes M1$i$ and M2$i$ for the first and the second streams are also set. The pair of M1$i$ and M2$i$ of data modulation schemes may be derived from SINR1 and SINR2 respectively by the MMSE based SINR calculation unit 51 like the first to third embodiments. Or, like the fourth embodiment, the pair of M1$i$ and M2$i$ of data modulation schemes may be one of all possible combinations. Further, like the fifth embodiment, the pair may be set to be the reference pair. In step 1, a repetition variable update$_1$ and a repetition variable update$_2$ are initialized (for the sake of explanation, the initial values are 1 respectively).

In step 2, correction values Δq(1) and Δq(2) are calculated based on interference amounts q2(1) and q2(2) which each stream receives from other stream, so that the third signal qualities q3(1) and q3(2) are updated under a condition. In the present embodiment, although the signal quality is represented by SINR, it may be represented by other amount. More particularly, when the repetition variable update$_2$ for the second stream is 1, the third signal quality q3(1) for the first stream is updated, and if it is not 1, the third signal quality q3(1) for the first stream is not changed.

$$SINR1'=SINR1+\Delta SINR1 \text{ (when update}_2\text{=1)}$$

$$SINR1'=SINR1 \text{ (when update}_2\text{=0)}$$

Similarly, when the repetition variable update$_1$ for the first stream is 1, the third signal quality q3(2) for the second stream is updated, and if it is not 1, the third signal quality q3(2) for the second stream is not changed.

$$SINR2'=SINR2+\Delta SINR2 \text{ (when update}_1=1)$$

$$SINR2'=SINR2 \text{ (when update}_1=0)$$

In step 3, the repetition variables update$_1$ and update$_2$ are updated. As for the first stream, when the correction value $\Delta q(1)=\Delta SINR_1$ is positive, the repetition variable update$_1$ of the first stream is set to be 1, and if it is not positive, the repetition variable update$_1$ of the first stream is set to be 0. As for the second stream, when the correction value $\Delta q(2)=\Delta SINR_2$ is positive, the repetition variable update$_2$ of the second stream is set to be 1, and if it is not positive, the repetition variable update$_2$ of the second stream is set to be 0. In addition, in step 3, the first signal qualities q1(1) and q1(2) are updated to the third signal qualities q3(1) and q3(2) respectively (SINR1=SINR1' and SINR2=SINR2').

In step 4, it is determined whether to continue the repetition calculation. More particularly, it is determined whether both of the repetition variables of the first and the second streams are 0. If both of them are not 0, the flow returns to step 2, so that the repetition calculation continues. If both of them are 0, the flow ends.

The repetition variable update$_1$ of the first stream is set to 1 only when the quality of the first stream improves toward plus direction. When the quality of the first stream is unchanged (when it is 0) or when the quality of the first stream is deteriorated (when it is negative), the repetition variable update$_1$ is set to 0. Also, the repetition variable update$_2$ of the second stream is set to 1 only when the quality of the second stream improves toward plus direction. When the quality of the second stream is unchanged (when it is 0) or when the quality of the second stream is deteriorated (when it is negative), the repetition variable update$_1$ is set to 0. Therefore, in step 4, the flow ends when both of the first and the second streams reach an optimum value, and when there is a room to improve in any one of them, the flow returns to step 2 to perform repetition calculation.

In step 2, the repetition variable update$_2$ of the second stream is used as an update decision criterion of the signal quality q3(1) of the first stream. This corresponds to the fact that an input of a stream to the correction value calculation unit 56 is supplied from an output destination of the SER calculation unit 54 of another stream as shown in FIG. 13 and the like. As mentioned above, when the quality of the second stream improves and the symbol error rate SER decreases, interference exerted to the first stream by the second stream when performing signal detection becomes small, and it is expected that the quality of the first stream also improves. In step 2, the fact that the repetition variable update$_2$ of the second stream is 1 indicates that the quality of the second stream improves toward plus direction in the preceding update step. In this case, since it is expected that the quality of the first stream further improves, the quality SINR$_1$ of the first stream is updated together with the correction value $\Delta SINR_1$. In the same way, in step 2, the fact that the repetition variable update$_1$ of the first stream is 1 indicates that the quality of the first stream improves toward plus direction in the preceding update step. In this case, since it is expected that the quality of the second stream further improves, the quality SINR$_2$ of the second stream is updated together with the correction value $\Delta SINR_2$.

In the present embodiment, repetition variables update$_1$ and update$_2$ each having a binary value of 1 or 0 are used as the decision criteria for flow repetition. But, this is merely an example. Any proper decision criterion may be used for determining whether the quality SINR of each stream reaches an optimum value. However, from the viewpoint of simplifying the determination, it is preferable to use the binary repetition variable like the present embodiment.

By the way, when repetition calculation is performed by feeding an output back to an input, it is desirable that the output is calculated accurately to some extent. If not, an output updated by the feedback leads to deterioration of accuracy, and may result in instability of calculated values. From such a viewpoint, it can be considered to perform the repetition calculation of FIG. 14 only when the quality of the first and the second streams is relatively good, and considered not to perform the repetition calculation when the quality is not good. Whether the quality of the first and the second streams is good or not may be determined using any proper determination criterion. As an example, the coefficient a appeared in the equation (10) can be used.

Figure 15:
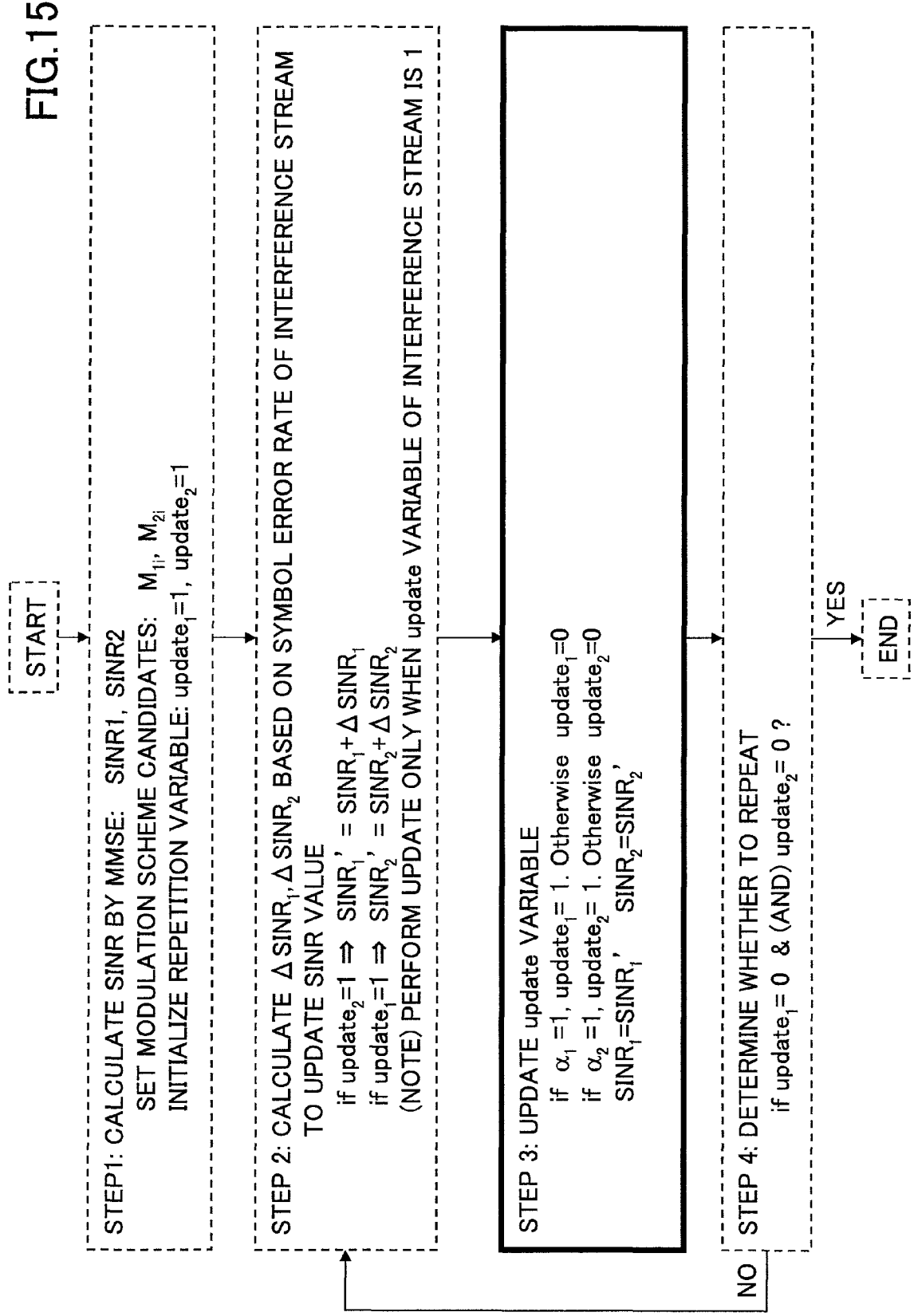
FIG. 15 shows a flowchart of another operation example used in the sixth embodiment.

FIG. 15 shows another operation example used in the present embodiment. Since steps other than step 3 have been described with reference to FIG. 14, repeated description for the steps is not provided. In step 3, repetition variables update$_1$ and update$_2$ are updated. As to the first stream, when the coefficient $\alpha_1$ is 1, the repetition variable update$_1$ of the first stream is set to be 1, and if not, the repetition variable update$_1$ of the first stream is set to be 0. As to the second stream, when the coefficient $\alpha_2$ is 1, the repetition variable update$_2$ of the second stream is set to be 1, and if not, the repetition variable update$_2$ of the second stream is set to be 0. In step 3, the first signal qualities q1(1) and q1(2) are updated to the third signal qualities q3(1) and q3(2) (SINR1=SINR1' and SINR2=SINR2').

According to the equation (15), the signal quality of the first stream is between the lower limit value $SINR_{MMSE}(1)$ and the upper limit value $SINR_{free}$. Also, the signal quality of the second stream is between the lower limit value $SINR_{MMSE}(2)$ and the upper limit value $SINR_{free}$.

$$SINRe(1)=(1-\alpha_1)\times SINR_{MMSE}(1)+\alpha_1\times SINR_{free},$$
$$0\leq\alpha_1\leq1$$

$$SINRe(2)=(1-\alpha_2)\times SINR_{MMSE}(2)+\alpha_2\times SINR_{free},$$
$$0\leq\alpha_2\leq1$$

When the coefficient $\alpha_1$ is 1, the signal quality of the first stream becomes SINRfree=$|h_1|^2/\sigma^2$, which indicates a situation where other stream interference can be neglected. Similarly, when the coefficient $\alpha_2$ is 1, the signal quality of the second stream becomes SINRfree=$|h_2|^2/\sigma^2$, which indicates a situation where other stream interference can be neglected. In step 3 shown in FIG. 15, the repetition variable update$_1$ and/or update$_2$ are/is set to be 1 only when the communication state is good like the above-mentioned situation, and only when both of them have 1, repetition calculation is performed (step 4). By configuring like this, high accuracy can be obtained while considering instability of calculation accuracy.

Concrete examples of the coefficients $\alpha_1$ and $\alpha_2$ are shown in the equation (11). But, the coefficients are not limited to these. For example, the coefficient may be changed not only according to the symbol error rate SER but also according to data modulation scheme and the like. Although the repetition variables update$_1$ and update$_2$ are updated when the coefficients $\alpha_1$ and $\alpha_2$ are strictly equal to 1 in step 3 for simplifying explanation, update is not limited to that case. For example, update may be performed when the coefficient is close to 1 ($|1-\alpha|<\epsilon$, $\epsilon$ is a positive small value).

[Embodiment 7]

Figure 16:
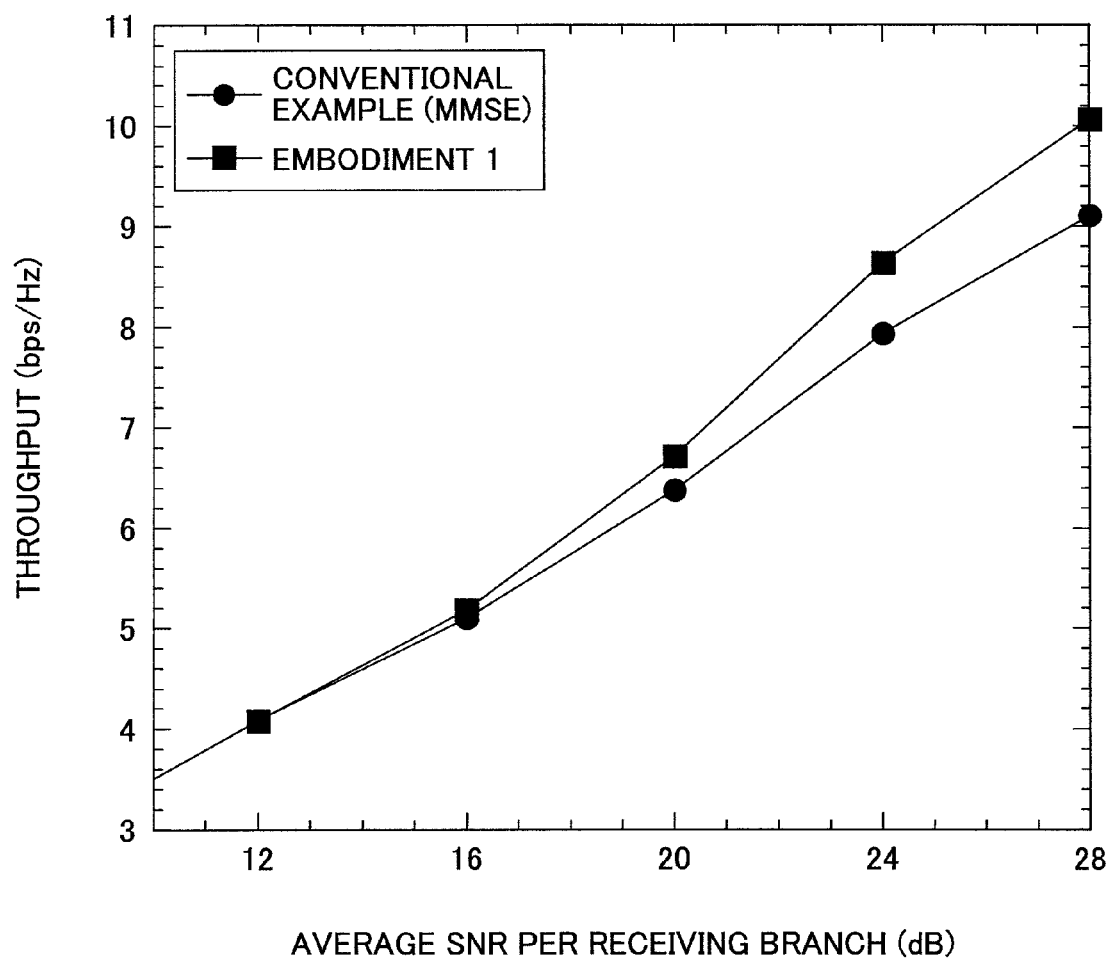
FIG. 16 is a diagram showing a simulation result for the first embodiment.

FIG. 16 shows a graph of a simulation result on the first embodiment. In the graph, the horizontal axis indicates average SNR(dB) per receiving branch, which corresponds to signal quality. The vertical axis indicates spectrum efficiency (bps/Hz), which corresponds to throughput per unit frequency, which also corresponds to goodness of signal quality. FIG. 17 shows parameter data that was actually used for the simulation of FIG. 16.

In the figure, data plotted using circle marks indicates a graph (conventional example) of the case when signal detection and link adaptation are performed by the MMSE method. Points plotted using rectangle marks indicate a graph of the case when signal detection and link adaptation are performed by the method of the first embodiment of the present invention. As shown in the figure, when the average SNR is bad, the spectrum efficiency is not largely different between the case of the first embodiment and the case of the conventional example. However, as the average SNR becomes good, the spectrum efficiency improves in the case of the first embodiment compared to the case of the conventional example. Accordingly, the third signal quality q3 (SINRe in the above-mentioned example) becomes equal to or greater than the first signal quality q1 ($SINR_{MMSE}$ in the above-mentioned example).

Figure 18:
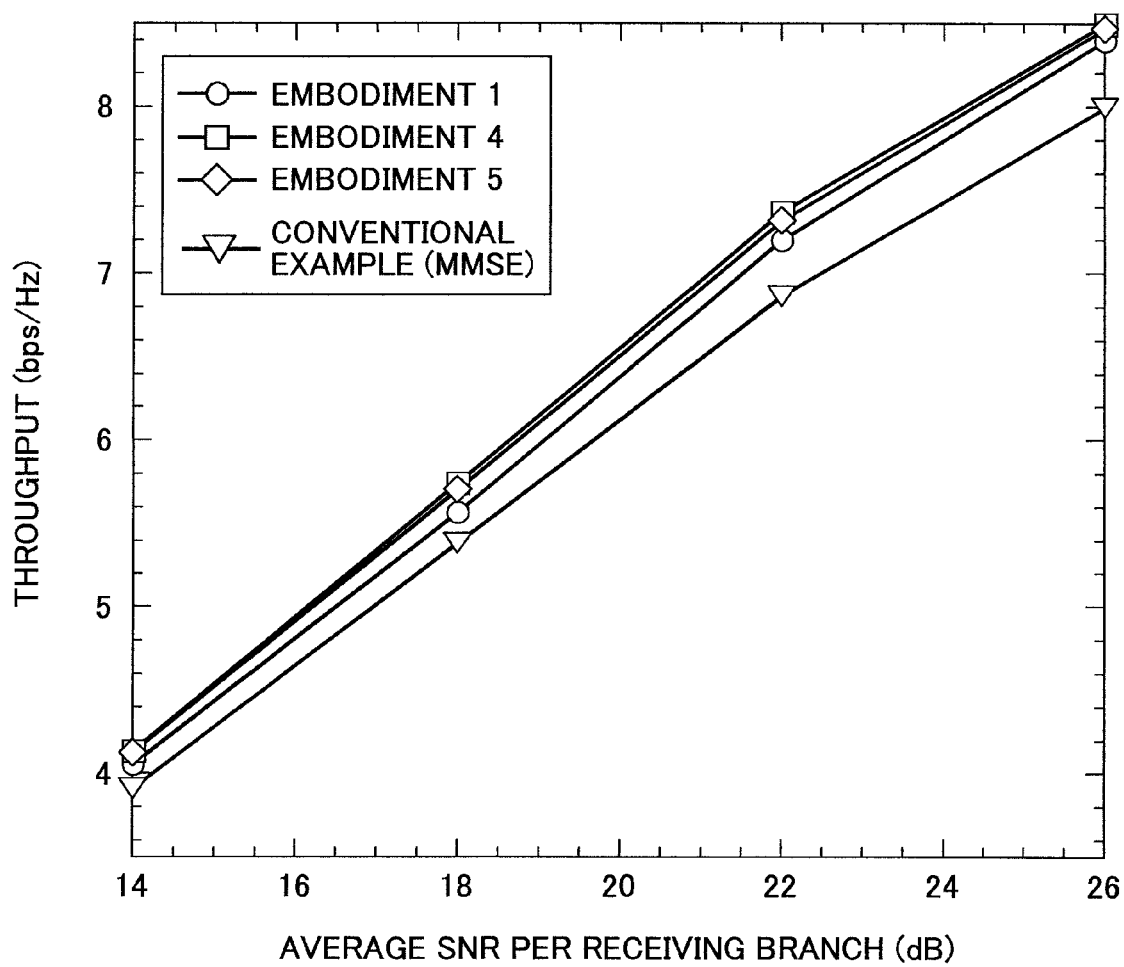
FIG. 18 is a diagram showing simulation results for the first, fourth and fifth embodiments.

FIG. 18 shows a graph of a simulation result for the first, fourth and the fifth embodiments. Also in the example, the 2×2MIMO scheme is assumed, the number of multipath is 1, and non-correlation channel is assumed. In this simulation result, the graph for the first embodiment is plotted using circle marks, and it can be seen that the case of the first embodiment improves compared to the conventional example (MMSE) plotted using inverted triangle marks. This point is the same as FIG. 16. In the fourth embodiment, throughput is calculated for every possible combination (9 patterns) of data modulation schemes, so that an optimum combination is selected. Therefore, the fourth embodiment in which the graph is plotted using rectangle marks is improved compared to the first embodiment. In the fifth embodiment, throughput is calculated only for the reference pair and the secondary pair among all of the possible (9) combinations of the data modulation schemes, so that an optimum combination is selected from them. Pairs other than the reference pair and the secondary pair are not calculated. As shown in the figure, the fifth embodiment in which the graph is plotted using rhombus marks achieves throughput similar to that of the fourth embodiment. The fifth embodiment requires less calculation load than the fourth embodiment. Therefore, from the viewpoint of calculation efficiency, it can be understood that the fifth embodiment is preferable to a considerable degree.

The present invention may be used in any proper mobile communication system in which the MIMO scheme and AMC are used. For example, the present invention may be applied to a W-CDMA system of a HSDPA/HSUPA scheme, a system of a LTE scheme, an IMT-Advanced system, WiMAX, a system of Wi-Fi scheme, and the like.

As described above, while the present invention is described with reference to specific embodiments, the respective embodiments are merely exemplary, so that a skilled person will understand variations, modifications, alternatives, and replacements. For example, although transmission of two streams by two antennas is described in the above examples, the number of antennas and the number of streams may be greater than those. While specific numerical value examples are used to facilitate understanding of the present invention, such numerical values are merely examples, so that any appropriate value may be used unless specified otherwise. While specific equations are used to facilitate understanding of the present invention, such equations are merely examples, so that any appropriate equations may be used unless specified otherwise. Classification into each embodiment or item is not essential in the present invention, and features described in equal to or more than two embodiments or items may be used as necessary by combining them. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2008-136019, filed in the JPO on May 23, 2008, and the entire contents of the Japanese patent application No. 2008-136019 is incorporated herein by reference.

The present international application claims priority based on Japanese patent application No. 2008-284767, filed in the JPO on Nov. 5, 2008, and the entire contents of the Japanese patent application No. 2008-284767 is incorporated herein by reference.

DESCRIPTION OF REFERENCE SIGNS

51 MMSE based SINR calculation unit
52 data modulation scheme selection unit
54 SER calculation unit
56 correction value calculation unit
58 rate calculation unit
60 throughput calculation unit
62 combining unit
111 modulation scheme set determination unit

The invention claimed is:

1. A communication apparatus for use in a mobile communication system that uses a MIMO scheme and an adaptive modulation channel coding scheme, comprising:
   a signal detection unit configured to calculate a reference signal quality for each stream determined by a signal detection method which is different from a maximum likelihood estimation method;
   a data modulation scheme selection unit configured to determine a data modulation scheme for each stream of the reference signal quality;
   a correction value calculation unit configured to determine a correction value according to an interference amount which each stream receives from other stream, based on the reference signal quality and the data modulation scheme of each stream;
   an adding unit configured to determine a signal quality for rate determination for each stream by adding the reference signal quality and the correction value of each stream; and
   a rate calculation unit configured to determine a channel coding rate corresponding to the signal quality for the rate determination for each stream,
   wherein the determined data modulation scheme and channel coding rate are used for transmission.

2. The communication apparatus as claimed in claim 1, wherein a candidate of the data modulation scheme of each stream is selected from among a plurality of choices, and the channel coding rate is determined for the selected data modulation scheme, and
   a data modulation scheme and a channel coding rate of each stream that are optimal in a predetermined data modulation scheme and channel coding rate determination criterion are determined.

3. The communication apparatus as claimed in claim 2, wherein a main candidate corresponding to the reference signal quality of each stream is derived from among the plurality of choices of data modulation schemes, and the channel coding rate is determined for at least the main candidate.

4. The communication apparatus as claimed in claim 3, wherein a sub-candidate having a rate different from the rate of the main candidate by a predetermined level is determined for each of first and second streams, and
a channel coding rate and throughput of each stream are calculated for a predetermined combination including the main candidate or the sub-candidate among all possible combinations of the data modulation schemes of the first and the second streams.

5. The communication apparatus as claimed in claim 4, wherein the predetermined combination including the main candidate or the sub-candidate includes:
a combination of a main candidate of the first stream and a main candidate of the second stream, or
a combination of a sub-candidate having a higher rate than the rate of the main candidate of the first stream and a sub-candidate having a lower rate than the rate of the main candidate of the second stream.

6. The communication apparatus as claimed in claim 1, wherein the signal detection method which is different from the maximum likelihood estimation method is a minimum mean square error (MMSE) method.

7. The communication apparatus as claimed in claim 1, wherein the correction value is calculated such that the correction value is in proportion to a difference between the signal quality in a case where inter-stream interference can be neglected and the reference signal quality.

8. The communication apparatus as claimed in claim 7, wherein a proportionality coefficient used for calculating the correction value of a stream is predetermined according to a possible value of an interference amount which the stream receives.

9. The communication apparatus as claimed in claim 8, wherein the proportionality coefficient used for calculating the correction value of the stream is determined according to a radio channel state or a data modulation scheme of other stream.

10. The communication apparatus as claimed in claim 1, wherein the signal detection method which is different from the maximum likelihood estimation method is a zero forcing (ZF) method.

11. The communication apparatus as claimed in claim 1, wherein, when the signal quality for rate determination of a stream exceeds a predetermined value, the data modulation scheme of the stream is changed.

12. The communication apparatus as claimed in claim 11, wherein, when the signal quality for rate determination of a certain stream exceeds a predetermined value, the channel coding rate of a stream other than the certain stream is also changed.

13. The communication apparatus as claimed in claim 1, wherein the interference amount for deriving the correction value is derived from a symbol error rate (SER) or a desired signal power to undesired signal power ratio (SINR) and the data modulation scheme of each stream.

14. The communication apparatus as claimed in claim 1, wherein the communication apparatus determines a second correction value, by a repetition processing, using the reference signal quality to which the correction value is added as the signal quality.

15. The communication apparatus as claimed in claim 14, wherein the communication apparatus determines presence or absence of the repetition processing according to the second correction value.

16. A user apparatus comprising the communication apparatus as claimed in claim 1.

17. A base station apparatus comprising the communication apparatus as claimed in claim 1.

18. A communication method for use in a mobile communication system that uses a MIMO scheme and an adaptive modulation channel coding scheme, comprising the steps of:
calculating a reference signal quality for each stream determined by a signal detection method which is different from a maximum likelihood estimation method;
determining a data modulation scheme for each stream of the reference signal quality;
determining a correction value according to an interference amount which each stream receives from other stream, based on the calculated reference signal quality and the determined data modulation scheme of each stream;
determining a signal quality for rate determination for each stream by adding the reference signal quality and the determined correction value of each stream; and
determining a channel coding rate corresponding to the determined signal quality for rate determination for each stream,
wherein the determined data modulation scheme and channel coding scheme rate are used for transmission.

19. The communication method as claimed in claim 18, wherein a candidate of the data modulation scheme of each stream is selected from among a plurality of choices, and the channel coding rate is determined for the selected data modulation scheme, and
a data modulation scheme and a channel coding rate of each stream are determined such that throughput achievable by a plurality of streams becomes high.

20. The communication method as claimed in claim 19, wherein a main candidate corresponding to the reference signal quality of each stream is derived from among the plurality of choices of data modulation schemes, and the channel coding rate is determined for at least the main candidate.

21. The communication method as claimed in claim 20, wherein a sub-candidate having a rate different from the rate of the main candidate by a predetermined level is determined for each of first and second streams, and
a channel coding rate and throughput of each stream are calculated for a predetermined combination including the main candidate or the sub-candidate among all possible combinations of the data modulation schemes of the first and the second streams.

22. The communication method as claimed in claim 21, wherein the predetermined combination including the main candidate or the sub-candidate includes:
a combination of a main candidate of the first stream and a main candidate of the second stream, or
a combination of a sub-candidate having a higher rate than the rate of the main candidate of the first stream and a sub-candidate having a lower rate than the rate of the main candidate of the second stream.

23. The communication method as claimed in claim 18, wherein the signal detection method which is different from the maximum likelihood estimation method is a minimum mean square error (MMSE) method.

24. The communication method as claimed in claim 18, wherein the correction value is calculated such that the correction value is in proportion to a difference between the signal quality in a case where inter-stream interference can be neglected and the reference signal quality.

25. The communication method as claimed in claim 24, wherein a proportionality coefficient used for calculating the correction value of a stream is predetermined according to a possible value of an interference amount which the stream receives.

26. The communication method as claimed in claim 25, wherein the proportionality coefficient used for calculating the correction value of the stream is determined according to a radio channel state or a data modulation scheme of other stream.

27. The communication method as claimed in claim 18, wherein, when the signal quality for rate determination of a stream exceeds a predetermined value, the data modulation scheme of the stream is changed.

28. The communication method as claimed in claim 27, wherein, when the signal quality for rate determination of a certain stream exceeds a predetermined value, the channel coding rate of a stream other than the certain stream is also changed.

* * * * *

UNITED STATES PATENT AND TRADEMARK OFFICE
CERTIFICATE OF CORRECTION

| | |
|---|---|
| PATENT NO. | : 8,681,886 B2 |
| APPLICATION NO. | : 12/994214 |
| DATED | : March 25, 2014 |
| INVENTOR(S) | : Hidekazu Taoka et al. |

It is certified that error appears in the above-identified patent and that said Letters Patent is hereby corrected as shown below:

In the Claims:

At column 24, claim number 18, line number 31, "coding scheme rate are used for transmission." should read -- coding rate are used for transmission. --

Signed and Sealed this
Fifteenth Day of July, 2014

Michelle K. Lee
*Deputy Director of the United States Patent and Trademark Office*